US00RE37269E

(19) United States
(12) Reissued Patent
Yamaguchi et al.

(10) Patent Number: US RE37,269 E
(45) Date of Reissued Patent: Jul. 10, 2001

(54) AIR INTAKE ARRANGEMENT FOR INTERNAL COMBUSTION ENGINE

(75) Inventors: Jun'ichi Yamaguchi, Hitachi; Minoru Ohsuga; Toshiharu Nogi, both of Hitachinaka; Mamoru Fujieda, Tomobe-machi; Nobuo Kurihara, Hitachioota; Yoshishige Ohyama, Hitachinaka; Hiroyuki Yamada, Hitachinaka; Shigeyuki Kemma, Hitachinaka, all of (JP)

(73) Assignee: Hitachi, Ltd., Tokyo (JP)

(21) Appl. No.: 08/677,360

(22) Filed: Jul. 5, 1996

Related U.S. Patent Documents

Reissue of:
(64) Patent No.: 5,325,828
Issued: Jul. 5, 1994
Appl. No.: 08/105,366
Filed: Aug. 12, 1993

(30) Foreign Application Priority Data

Aug. 31, 1992 (JP) ..... 4-230864
Aug. 31, 1992 (JP) ..... 4-230867

(51) Int. Cl.[7] ..... F02M 25/07; F02M 23/04; F02M 35/024; F02B 31/08

(52) U.S. Cl. ..... 123/308; 123/568.15; 123/568.18; 123/585

(58) Field of Search ..... 123/306, 308, 123/339.14, 568, 569, 570, 571, 585, 587, 184.38, 184.42, 184.45, 568.11, 568.15, 568.17, 568.18, 568.21

(56) References Cited

U.S. PATENT DOCUMENTS 3,811,419 5/1974 Eckert et al. ..... 123/452
4,304,211 12/1981 Tezuka et al. ..... 123/585
4,484,549 * 11/1984 Yokoyama ..... 123/308
4,593,672 * 6/1986 Barone ..... 123/568
4,614,184 * 9/1986 Hansen ..... 123/571
4,671,233 * 6/1987 Iwashita et al. ..... 123/308

(List continued on next page.)

FOREIGN PATENT DOCUMENTS 2930697 7/1979 (DE) .
3338653A1 10/1983 (DE) .

(List continued on next page.)

*Primary Examiner*—Willis R. Wolfe
(74) *Attorney, Agent, or Firm*—Antonelli, Terry, Stout & Kraus, LLP

(57) ABSTRACT

An air intake arrangement for an internal combustion engine comprising: a main air intake conduit leading to a gas intake valve (241) for respective engine cylinders (206) and including a main air intake passage (202), a main collector chamber (204) and independent branching air intake passages (205) for the respective engine cylinders (206) connected in series; a throttle valve (203) disposed in the main intake air passage (202) for controlling the flow rate of air passing therethrough; an auxiliary air intake passage (210) bypassing the main air intake conduit, *wherein* an inlet port of the auxiliary air intake passage (210) opens into the main air intake passage (202) [at the] upstream of the throttle valve (203), *and* an outlet port (213) of the auxiliary air intake passage (210) opens into the respective independent branching air intake passage (205) near the gas intake valve (241) for the respective engine cylinders (206) in such a manner that gas blown-out from the auxiliary air intake passage (210) induces a gas swirl in the respective engine cylinders (206); an intake air control valve (211) disposed in the auxiliary air intake passage (210) for controlling the flow rate of air passing therethrough; and a control unit (222) which [determined] *determines* an operating condition of the internal combustion engine and controls an opening degree of the intake air control valve (211) based on the determined engine operating condition.

130 Claims, 23 Drawing Sheets

U.S. PATENT DOCUMENTS

| | | | | |
|---|---|---|---|---|
| 4,700,676 | * | 10/1987 | Harashima et al. | 123/339.14 |
| 4,776,313 | * | 10/1988 | Frismuth et al. | 123/184.42 |
| 4,805,564 | * | 2/1989 | Hudson, Jr. | 123/184.42 |
| 4,856,473 | * | 8/1989 | Kawai et al. | 123/308 |
| 4,907,547 | | 3/1990 | Daly | 123/184.53 |
| 4,969,446 | * | 11/1990 | Olsson et al. | 123/585 |
| 4,991,547 | * | 2/1991 | Davis et al. | 123/568 |
| 5,056,309 | * | 10/1991 | Linder et al. | 123/568 |
| 5,133,307 | | 7/1992 | Kurihara | 123/184.31 |
| 5,156,133 | * | 10/1992 | Sugimoto et al. | 123/585 |
| 5,209,209 | * | 5/1993 | Karlsson et al. | 123/568 |
| 5,311,848 | * | 5/1994 | Isaka et al. | 123/308 |

FOREIGN PATENT DOCUMENTS

| | | | |
|---|---|---|---|
| 0054887A2 | | 12/1981 | (EP) . |
| 0177794 | | 9/1985 | (EP) . |
| 0355960 | | 6/1989 | (EP) . |
| 0-384359 | | 2/1990 | (EP) . |
| 0423607A1 | | 10/1990 | (EP) . |
| 0523027A2 | | 7/1992 | (EP) . |
| 2132692A | | 12/1982 | (GB) . |
| 57-181964 | | 9/1982 | (JP) . |
| 58-104359 | | 6/1983 | (JP) . |
| 58-135354 | | 11/1983 | (JP) . |
| 62-48927 | * | 3/1987 | (JP) . |
| 4-203437 | | 7/1992 | (JP) . |

* cited by examiner

AIR INTAKE ARRANGEMENT FOR INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an air intake arrangement for an internal combustion engine, and in particular, relates to an air intake arrangement for an internal combustion engine for performing a so called fuel lean air/fuel ratio [opeartion] *operation* wherein the engine is operated at a fuel lean side rather than the stoichiometric air/fuel ratio for improving fuel economy.

2. Description of Related Art

JP-A-62-48927(1987), for example, discloses a conventional air intake arrangement for performing a fuel lean air/fuel ratio operation wherein in an engine with two air intake valves there are provided two separate passages leading to the respective air intake valves[, an]. *An* intake air control valve is provided in one of the passages, [in] *so* that, in a straight port, during a low engine load the intake air control valve is closed so as to increase flow velocity of the intake air flowing into the combustion chamber[, further in]. *In* the other passage[, in that,] *a* swirl port or [herical] *helical* port, which is used during such low engine load condition, is bent so as to follow along the inner wall face of the combustion chamber[, as]. *As* a result, a swirl is caused in the combustion chamber thereby combusting speed of the mixture gas is increased and a stable combustion is obtained even with a fuel lean mixture gas.

During an idling operation of an engine, it is usually necessary to feed in a good response a small amount of air to the engine for realizing a smooth engine operation. Further, such measure is known that when auxiliary devices such as an air conditioner are rendered operative an amount of air is increased to compensate a torque consumed in the auxiliary devices in order to prevent a variation of the engine operating condition. However, in order to achieve a smooth engine operation it is desirable to be able to supply air for a torque-up use immediately when the auxiliary devices are turned on and a necessity of a torque-up occurs. Namely, it is desirable that air for torque-up use shows a good response.

Further, when a so called EGR operation is intended to be performed which improves fuel economy and cleans up the exhaust gas by reducing combustion temperature through the exhaust gas recirculation during a partial engine load, it is well known to introduce EGR gas into a collector which is a collecting portion of air intake conduits. Further, an EGR with about 0~20% EGR gas is recommended as a proper range for fuel economy improvement, therefore it is preferable to perform an EGR with a possible large % of EGR gas within the above range.

In the conventional air intake arrangement which is designed to generate a swirl, there is provided an intake air control valve in a main air passage near an air inlet valve, therefore there arises a problem that the intake air control valve constitutes a resistance to the intake air during an engine full load operation and effects to reduce the engine output.

Further, when the air intake valve is closed, fuel deposits onto the air intake valve and causes a problem which reduces an acceleration response of fuel supply.

Still further, a fuel injection valve, the mounting portion, fuel piping and air piping for fuel atomization for the fuel injection valve, and the air intake conduits conventionally were separately designed and assembled, the fuel injection valve is placed far remote from the center axis of the air intake conduit, as a result, an angle formed by the atomizing axis of the fuel injection valve and the center axis of the air intake conduit is increased which allows easy deposition of the fuel on the inner wall of the air intake conduits even when the air intake valve is opened, and causes a problem of reducing an acceleration response of fuel supply.

Further, since the direction of intake air is determined by the main air passage itself, it is difficult to effectively induce a swirling.

Still further, in case of the two air intake valve type engine, either a minimum flow passage cross sectional area of the swirl port has to be selected at about ½ of the main passage or the swirl port has to be more restricted than the straight port. In both cases, an adjustable range of the swirling strength depending on operating conditions of the engine is limited, and there arised a problem that an obtained swirl is sometimes weaker and sometimes stronger than that [reqired] *required* depending on the engine rpm. On the other hand, when the intake air control valve is opened, the air intake passage is narrowed by the existence of the swirl port and the air intake characteristic of the passage including the straight port and the swirl port is deteriorated, namely which caused a problem of reducing the maximum engine output.

Further, when air for an engine idling and for a torque-up operation is introduced into the collector which is a collecting portion of the air intake conduits, there arised a problem of deteriorating a response characteristic of intake air due to the large volume of the collector.

Likely, when EGR gas is introduced into the collector, the EGR gas interfers *with* the combustion, in particular, when it is required to accelerate combustion by means of swirling it is difficult to uniformly introduce the EGR gas to the respective cylinders of the engine. Further, during a transient engine operation a response of EGR gas supply delays and the combustion of the mixture gas is extremely interfered *with* depending on the engine operating condition which [arised] *created* a problem of impeding a large amount of EGR gas introduction.

SUMMARY OF THE INVENTION

Based on the indication above, the problems intended to be solved by the present invention are enumerated as follows.

A first object of the present invention is to provide an air intake arrangement which comprises means for inducing a swirl of proper strength in a combustion chamber depending on engine rpm and engine load.

A second object of the present invention is to provide an air intake arrangement for an engine having means for inducing a swirl which shows a desirable air intake characteristic and suppress reduction of engine output during an engine full load operation.

A third object of the present invention is to provide an air intake arrangement having a high stability during an engine idling operation and a high response characteristic during a torque-up operation in response to actuation of an auxiliary device.

A fourth object of the present invention is to provide an air intake arrangement having a high EGR gas response during an EGR operation and permitting a large amount of EGR gas introduction.

A fifth object of the present invention is to provide an air intake arrangement having a limited fuel deposition on air intake conduits and a desirable acceleration response of fuel.

For achieving the above object, the present invention is provided with the following measures.

At first, an auxiliary gas passage is provided other than a main passage of an air intake conduit and the outlet of the auxiliary gas passage is provided at the vicinity of an air intake valve. A plurality [kind] of gases such as air and EGR gas are introduced into the auxiliary gas passage and are used for a plurality of control purposes such as idling control, torque-up control and EGR control and fuel lean air/fuel ratio control. These gases introduced are controlled by a control valve provided at the auxiliary gas passage.

Further, a mounting member, fuel piping and air piping for fuel atomization for a fuel injection valve are formed integrally with an air intake conduit near an air intake valve so as to fit the fuel injection valve thereto.

As having been constituted as explained above, the air intake arrangement according to the present invention functions as follows.

First, since a cross sectional area of the auxiliary gas passage and an angle of the auxiliary gas passage with respect to the main air intake passage are freely determined and an amount of auxiliary air can be controlled by the control valve even during engine operation, the strength of the induced swirl can be [freedly] *freely* varied in a wide range in comparison with the conventional arrangement.

Further, in the present structure there are provided neither [with] the intake air control valve nor with the helical port in the main air passage, and elements constituting a resistance to intake air in the main air passage during engine full load operation [is] *are* eliminated, thereby the reduction of engine output is suppressed.

Still further, since the total volume of the auxiliary gas passage can be determined smaller than that of the main air passage, a necessary amount of air can be promptly supplied to the engine, thereby the response characteristic of the arrangement during idling operation, torque-up operation and EGR operation is improved.

Still further, since the EGR gas is introduced into the engine cylinders uniformly and without adversely affecting the combustion, the engine can [operates] *operate* stably even under an operation with a large amount of EGR gas.

Moreover, since the mounting member, fuel piping and air piping for fuel atomization for the fuel injection valve are formed integrally with the air intake conduit, the fuel injection valve can be placed close to the central axis of the air intake conduit, thereby an angle formed by *the* fuel atomization axis and the central axis of the air intake conduit can be reduced. Further, the air intake conduit can be optimally designed in accordance with a spreading configuration of the fuel atomization so as to reduce a deposition rate on the inner wall of the air intake conduit of the atomized fuel injected from the fuel injection valve. With these measures the fuel deposition on the air intake conduit is reduced.

BRIEF DESCRIPTION OF THE DRAWINGS

FIG. 2(a) is a map for determining an air/fuel ratio and an amount of EGR for an engine based on an engine operating condition represented by an engine rpm and engine load, and FIG. 2(b) is a map for determining an opening degree of an intake air control valve in engine operating regions I and II in FIG. 2(a) based on an engine operating condition [represent] *represented* by an engine rpm and engine load;

DETAILED DESCRIPTION OF THE EMBODIMENTS

Hereinbelow, embodiments of the present invention are explained with reference to the drawings.

Figure 1:
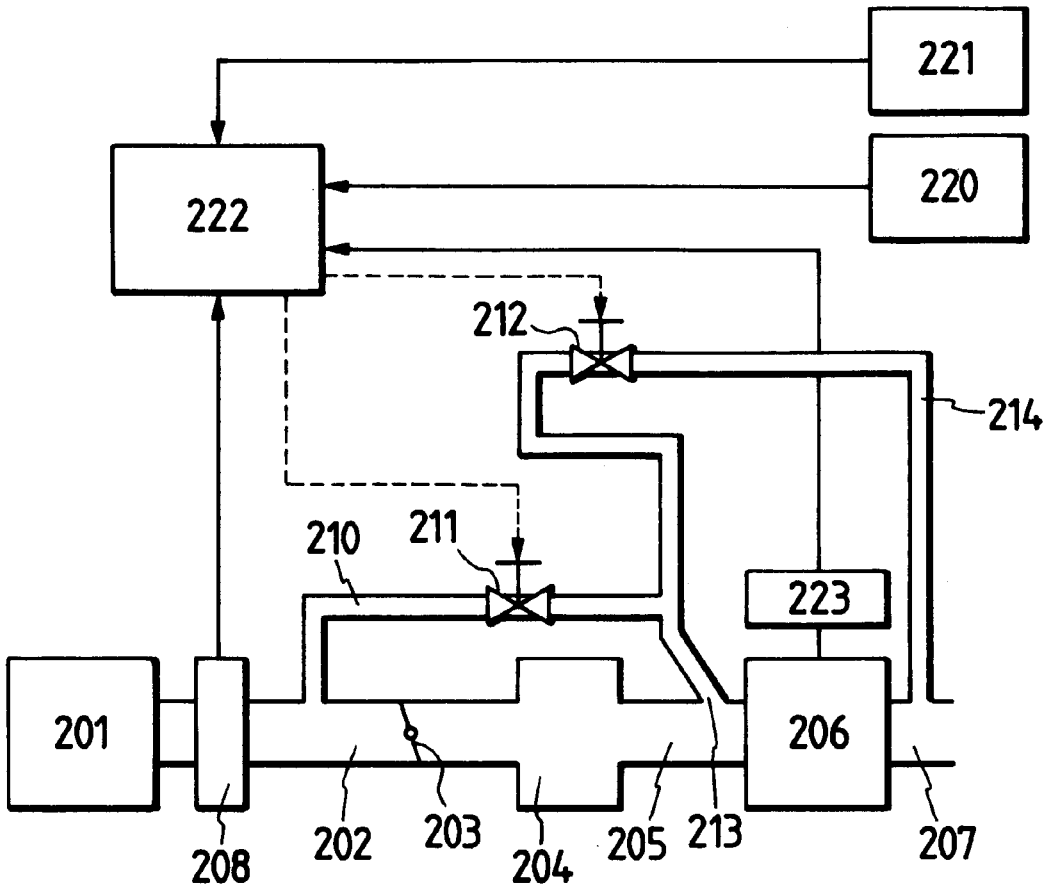
FIG. 1 is a schematic fluidic system diagram of a first embodiment of air intake arrangements for an internal combustion engine according to the present invention.

FIG. 1 shows one embodiment of the present invention. Inlet air is introduced from an air cleaner 201, and the flow rate thereof is measured by an air flow meter 208. An amount of air passing through a main passage 202 is adjusted by a throttle valve 203 and then distributed for respective engine cylinders from a collector 204 and thereafter introduced into an engine 206 via respective independent air intake conduits 205. In the present embodiment, an auxiliary gas passage 210 is provided in parallel with the respective independent air intake conduits 205. Air flow rate passing through the auxiliary gas passage 210 is adjusted through a control of an intake air control valve 211 by a computer 222 based on a signal from an acceleration pedal opening degree detecting means 221, an ON/OFF signal from engine accessories 220, a signal from an engine rpm detecting means 223 and an intake air amount signal from the air flow meter 208. In addition to the above, EGR gas is supplied to the auxiliary gas passage 210 from an engine exhaust gas conduit 207 via an EGR gas passage 214 and an EGR valve 212. An outlet port 213 of the auxiliary gas passage 210 opens into the independent air intake conduit 205 at the vicinity of an air intake valve (not shown) of the engine 206. At this moment, the flow velocity of the intake air flowing into the engine 205 is determined based on the flow rate of the auxiliary air and the opening cross sectional area of the auxiliary gas passage outlet port 213. When the opening cross sectional area of the auxiliary gas passage outlet port 213 is determined smaller than that of the independent air intake conduit 205, flow velocity of the intake air is raised and further, when the outlet port 213 is disposed eccentrically with respect to the circumference of the intake air conduit 205, a swirling can be induced in a combustion chamber (not shown) of the engine 206.

Figure 2A:
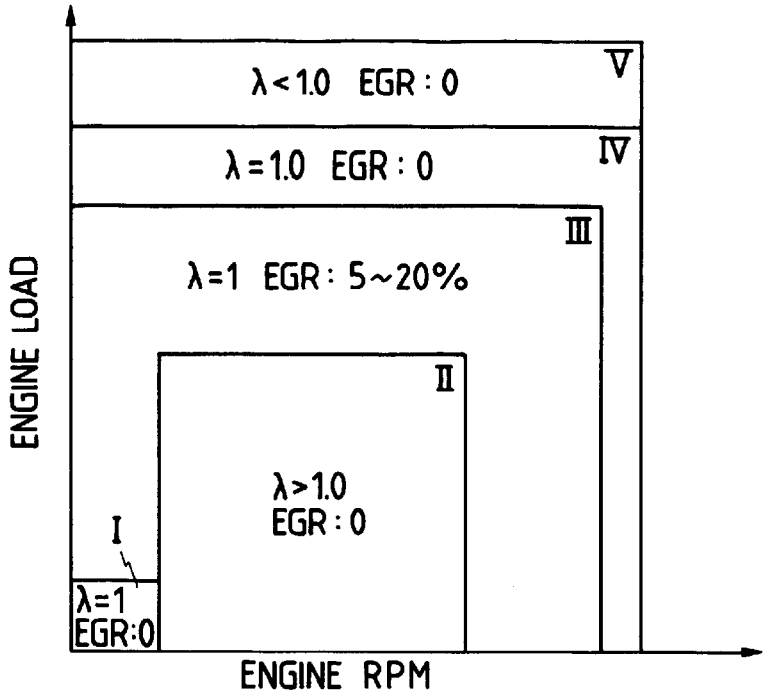
FIG. 2(a) and FIG. 2(b) are examples of maps used for controlling the air intake arrangements for an internal combustion engine according to the present invention.

FIG. 3 through FIG. 6 show diagrams for explaining operating conditions of the FIG. 1 embodiment depending upon engine operating regions as illustrated in FIG. 2(a).

Figure 2B:
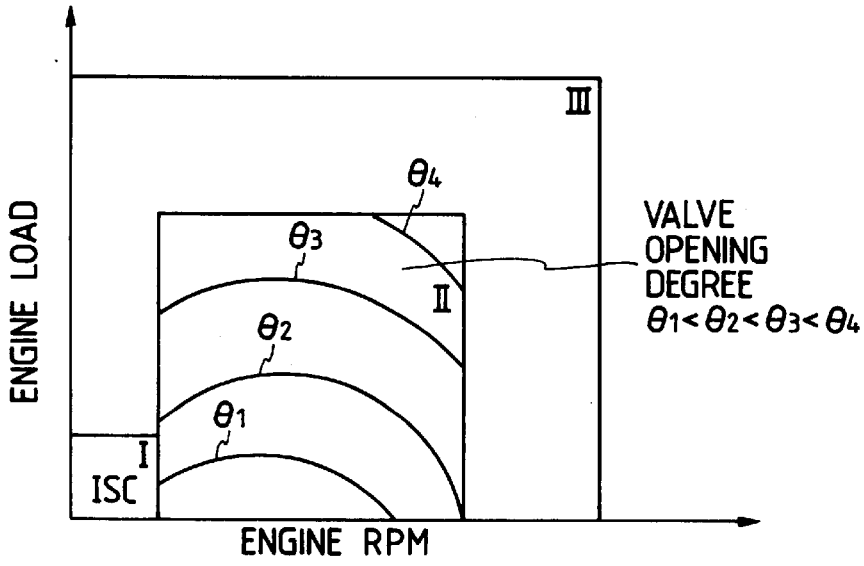

FIG. 2(a) and FIG. 2(b) are examples of maps used for controlling the air intake arrangements for an internal combustion engine according to the present invention, FIG. 2(a) is a map for determining an air/fuel ratio and an amount of EGR for an engine based on an engine operating condition represented by an engine rpm and engine load, and FIG. 2(b)

is a map for determining an opening degree of an intake air control valve in engine operating regions I and II in FIG. 2(a) based on an engine operating condition represent by an engine rpm and engine load.

Judgement under which region of FIG. 2(a) the present engine operating condition comes is determined by the computer 222 based on a signal from the engine rpm detecting sensor 223 and a signal from the acceleration pedal opening degree detecting sensor 221. Depending on the judgement, the intake gas control valve 211 and the EGR valve 212 are controlled so as to perform a control meeting the respective operating regions.

Controls corresponding to the respective operating regions are illustrated in FIG. 3 through FIG. 6.

Figure 3:
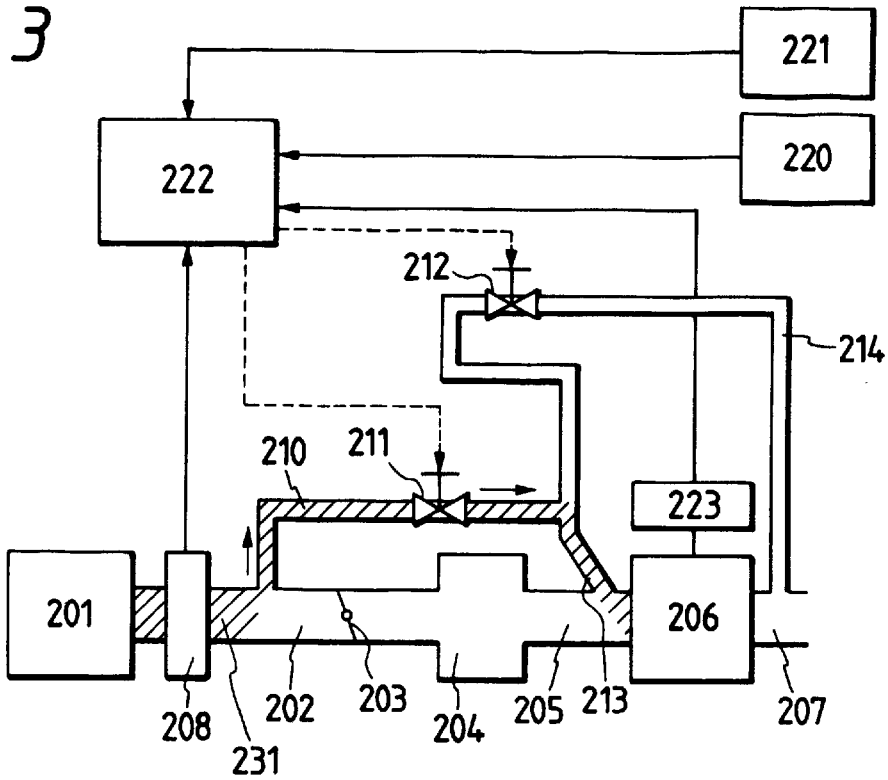
FIG. 3 is the same schematic fluidic system diagram of the first embodiment shown in FIG. 1 for explaining the operating condition thereof under engine operating region I in FIG. 2(a)

FIG. 3 shows an operating state under the region I wherein an engine rpm is low and no substantial load is applied. The throttle valve 203 and the EGR valve 212 are closed and the inlet air is adjusted by the intake air control valve 211. Namely, air 231 is supplied via the auxiliary gas passage 210 so as to maintain the air/fuel ratio at the stoichiometric air/fuel ratio. Under this condition, when the engine load is varied due to turn on or turn off of the engine accessories 220 or when the engine rpm varies due to a small internal condition change of the engine 206, a proper amount of intake air has to be immediately supplied in response to these changes in order to maintain a smooth engine operation. In the present embodiment, the entire inner volume of the auxiliary gas passage 210 is determined smaller than the totaled volume of the main passage 202 including the collector 204 and the independent air intake conduits 205 for the respective engine cylinders, for example, less than 80% of the totaled volume, the response characteristic with respect to a required air amount change is improved in comparison with the conventional arrangement wherein the intake air supply is performed via the main passage 202. Accordingly, with the present embodiment, air for idling operation can be supplied with a good response characteristic to meet an engine rpm variation, and an engine rpm stability is enhanced.

Figure 4:
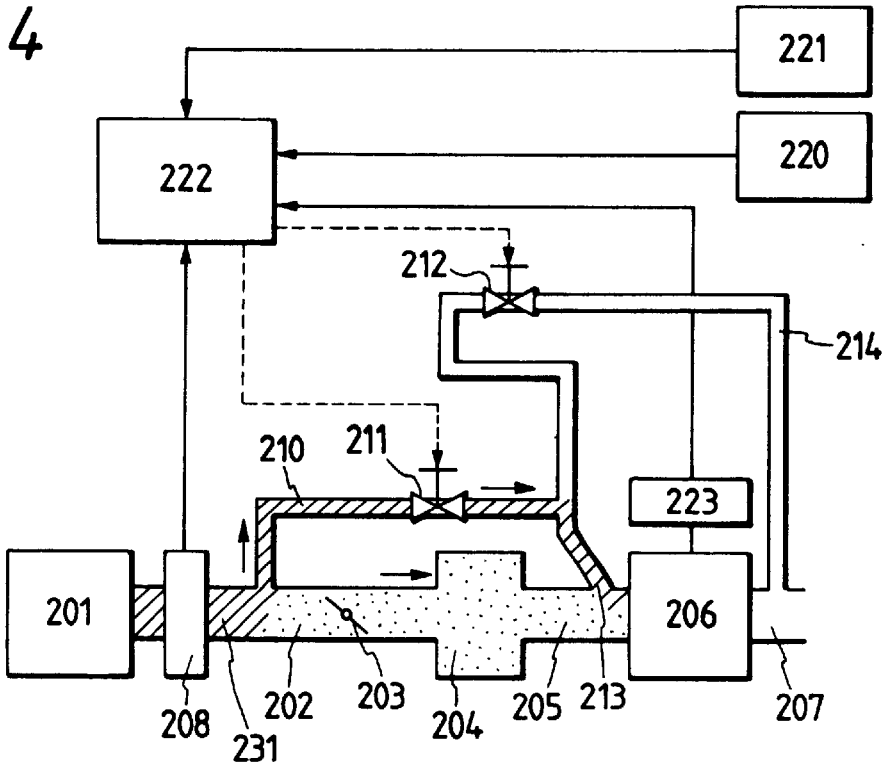
FIG. 4 is the same schematic fluidic system diagram of the first embodiment shown in FIG. 1 for explaining the operating condition thereof under engine operating region II in FIG. 2(a)

FIG. 4 shows an operating state under the region wherein the engine rpm is higher than that under region I and the engine load extends from a low to an intermediate region. The throttle valve 203 slightly opens dependent upon the engine load and engine rpm. The EGR valve 212 [is remained] *remains* in *a* closed state. In the region II, the air/fuel ratio is controlled at a fuel lean air/fuel ratio, for example, of 22~23, such that when the engine operating condition moves to other regions, an adjustment of the air/fuel ratio is necessitated. In the present embodiment, when the engine operating condition moves into the region II, the opening degree of the intake air control valve 211 is opened wider than those in other regions to increase inlet air amount. In addition thereto, the flow rate of the air 231 which flows into the engine 206 via the auxiliary gas passage inlet port 213 is increased, and the intake gas flow velocity is raised such that a swirling is induced in the combustion chamber (not shown) of the engine and the combustion speed of the mixture gas is increased, thereby a desirable combustion is obtained even with a fuel lean mixture gas. In this instance, by determining a proper cross sectional area of the auxiliary gas passage outlet port 213 the strength of the swirling is optimized. Namely, when it is required to increase the strength of the swirling, the cross sectional area of the passage outlet port 213 is set small, on the other hand, when it is required to decrease the strength, the cross sectional area thereof is set large. Further, for the air/fuel ratio control, a measure to vary the fuel amount supplied from the fuel injection valve (not shown) to the engine 206 can be used in parallel. With the present embodiment, in both cases one in which the engine operating condition moves into the region II from other adjacent regions and the other in which the engine operating condition moves from the region II to other adjacent regions, the amount of inlet air 231 can be increased or decreased with a good response.

Figure 5:
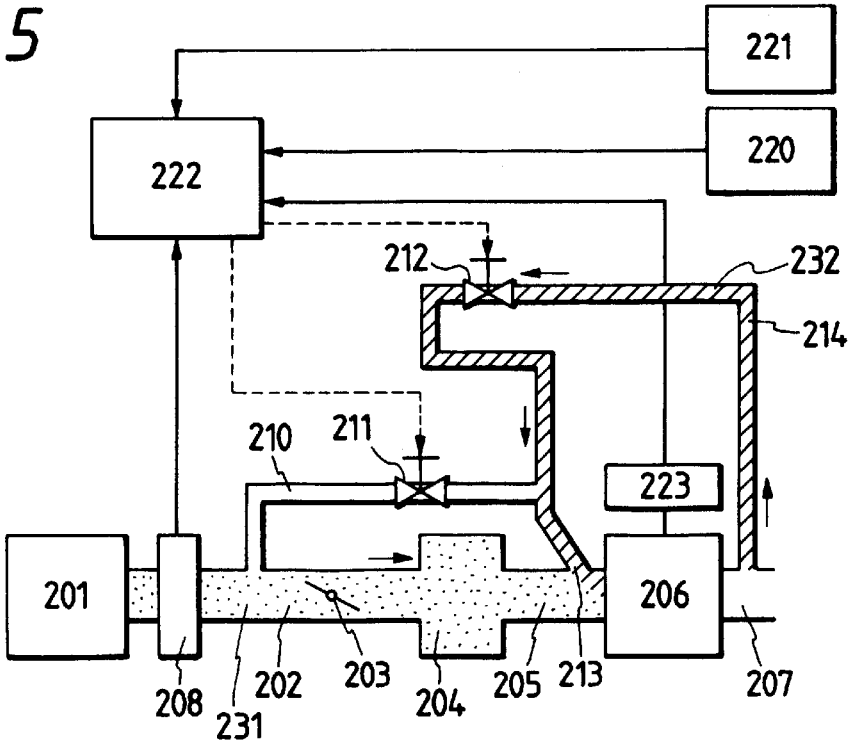
FIG. 5 is the same schematic fluidic system diagram of the first embodiment shown in FIG. 1 for explaining the operating condition thereof under engine operating region III in FIG. 2(a)

FIG. 5 shows an operating state under the region wherein either the engine rpm is extremely low and the engine load is larger than that under idling condition or the engine load is higher than that in the region or the engine rpm is higher than that in the region Under this region the air/fuel ratio is set at the stoichiometric air/fuel ratio for obtaining a higher torque. The throttle valve 203 opens in response to the engine load or the engine rpm. The amount of EGR gas is adjusted by the EGR valve 212 depending on engine operating conditions, thereby the combustion temperature is lowered and fuel economy is improved through a pumping loss reduction. The intake air control valve 211 is at this moment closed so as to prevent a reverse flow of the EGR gas. At this instance, the EGR gas 232 of a high velocity is supplied from the auxiliary gas passage outlet port 213 and is uniformly mixed with the air 231 passing through the main passage 202, thereby the distribution of the EGR gas to the respective cylinders of the engine is improved in comparison with the conventional arrangement wherein the EGR gas is supplied to the collector portion 204, as a result a limit of EGR amount can be expanded. Further, by orienting the auxiliary gas passage outlet port 213 to the direction along the wall face of the combustion chamber (not shown) of the engine, a swirling is induced in the combustion chamber to thereby improve combustion as well as to form a layer of the EGR gas 232 near the wall face thereof which reduces thermal loss through the wall face and achieves a fuel economy improvement. Further, when the inner volume of the EGR gas passage 214 is determined smaller than the totaled volume of the main passage 202 including the collector 204 and the independent gas intake conduits 205 for the respective engine cylinders, the EGR gas can be supplied to the engine with a good response.

Figure 6:
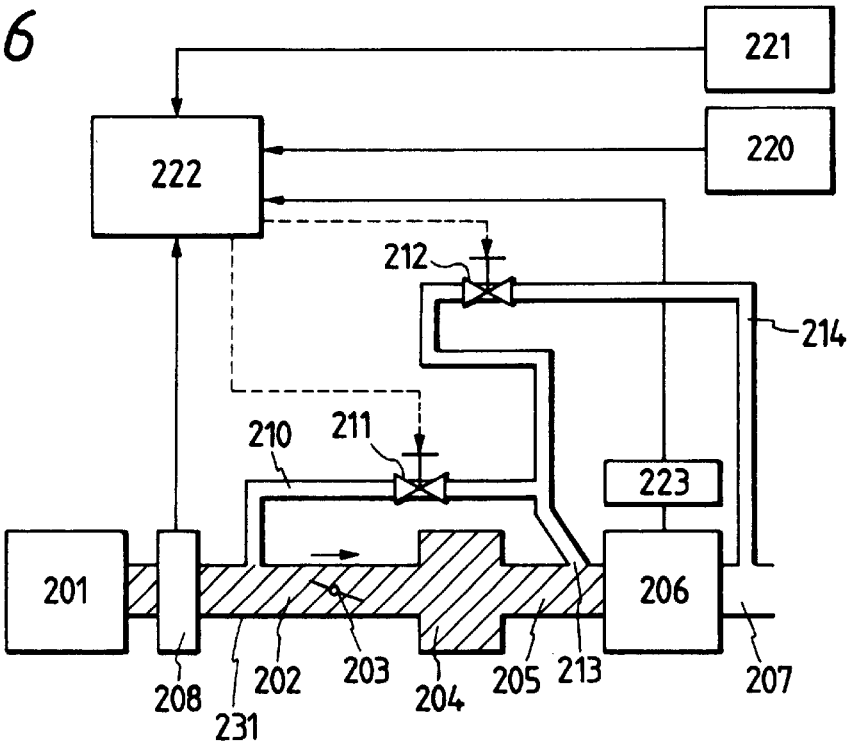
FIG. 6 is the same schematic fluidic system diagram of the first embodiment shown in FIG. 1 for explaining the operating condition thereof under engine operating region IV or V in FIG. 2(a)

FIG. 6 shows an operating state under the region IV and the region V wherein the engine rpm is further higher than under the region V or the engine load is further larger than under the region III. In these regions, the air/fuel ratio is set at the stoichiometric air/fuel ratio or at a fuel rich air/fuel ratio wherein an importance is placed on an engine operation for obtaining a necessary torque. The EGR valve 212 is closed, however the inlet air control valve 211 can take both conditions, that is, both open and close conditions. The throttle valve 203 in the main passage 202 is fully opened at a high engine load side, and at a high engine rpm side the opening degree of the throttle valve 203 is controlled depending upon a required torque. At this instance, different from the conventional arrangement, the elements in the independent gas intake conduits 205 such as an intake air control valve and a throttle for the air intake conduits which constitute a resistance for the intake air are eliminated to thereby prevent an engine output reduction.

FIG. 7 through FIG. 10 show structural embodiments of the auxiliary gas passage outlet ports 213 according to the present invention.

Figure 7:
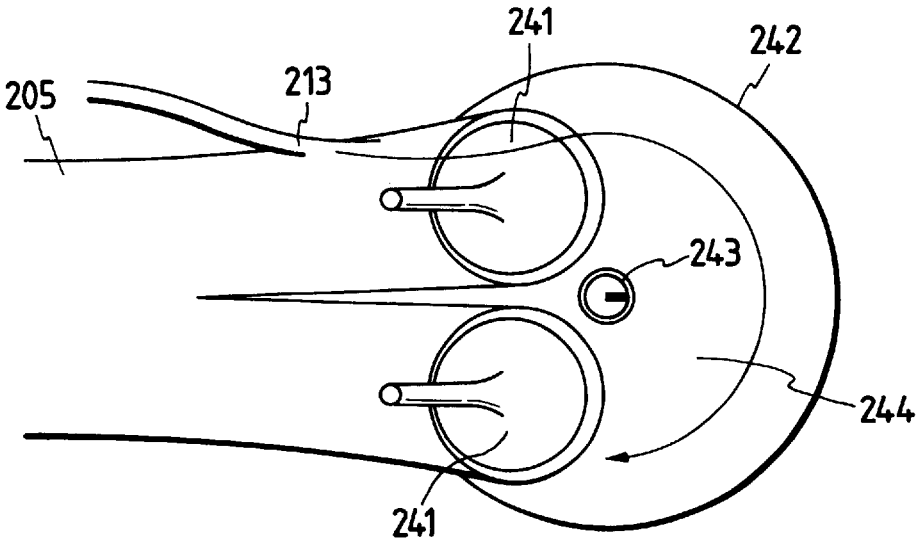
FIG. 7 is a schematic structural embodiment of an auxiliary gas passage outlet port opened into a main air passage near a gas intake valve for an engine cylinder which is included in the air intake arrangements according to the present invention.

FIG. 7 is an embodiment wherein the auxiliary gas passage outlet port 213 is disposed eccentrically toward the right side or the left side of the independent air intake conduit 205. With this structure, the auxiliary gas passes through the air intake valve 241 and flows along the circumference of an engine cylinder wall to thereby induce a strong swirling in a plane parallel with the piston top plane. When air is introduced as the auxiliary gas, excess air is supplied with respect to fuel and a condition of a fuel lean air/fuel ratio is generated, however, with the inducement of the swirling the combustion speed is increased and a desirable combustion is realized. Further, when EGR gas is introduced as the auxiliary gas, a uniform mixing of the EGR gas and air is achieved by making use of the swirling which lowers the combustion temperature and reduces a thermal loss effected via the engine cylinder wall as well as suppresses emission of nitrogen oxides.

Further, through the introduction of air or EGR gas from the auxiliary gas passage outlet port 213 to the engine cylinder wall face 242, a layer of air or EGR gas is formed along the circumference and a combustion is effected near the center portion of the combustion chamber 244 where an ignition plug 243 is disposed, thereby a thermal loss through the engine cylinder wall face 242 is reduced by means of adiabatic effect of air or EGR gas.

Figure 8:
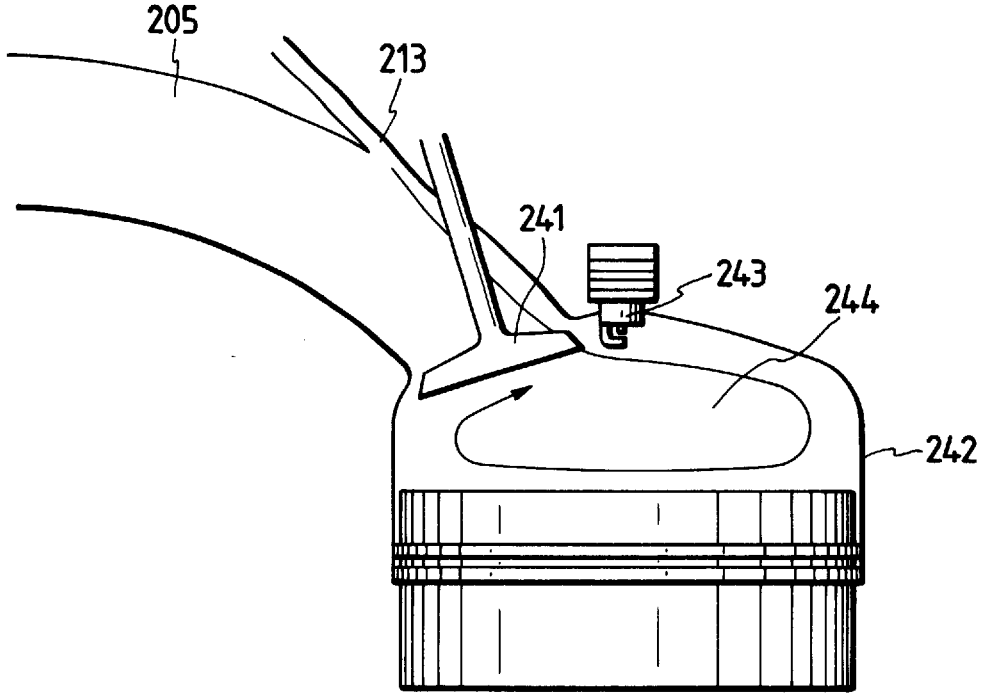
FIG. 8 is another schematic structural embodiment of an auxiliary gas passage outlet port opened into a main air passage near a gas intake valve for an engine cylinder which is included in the air intake arrangements according to the present invention.

FIG. 8 is another embodiment wherein the auxiliary gas passage outlet port 213 is disposed eccentrically toward the upper side of the independent air intake conduit 205. With this structure, the auxiliary gas passes through the air intake valve 241 and induces a vertical swiling (tumbling). At this instance, when fuel is injected from a fuel injection valve (not shown) only toward one of the two air intake valves 241, a mixture gas is formed only in a partial region of the combustion chamber 244 covered by the one air intake valve 241 located at one side. Thereby a stratification of the mixture gas in the combustion chamber 244 is achieved and a sufficiently combustible fuel lean mixture gas is obtained. Further, in an engine compression stroke the tumbles are collapsed and a multiplicity of small turbulences are generated such that a combustion speed is improved even with the fuel lean mixture gas.

Figure 9:
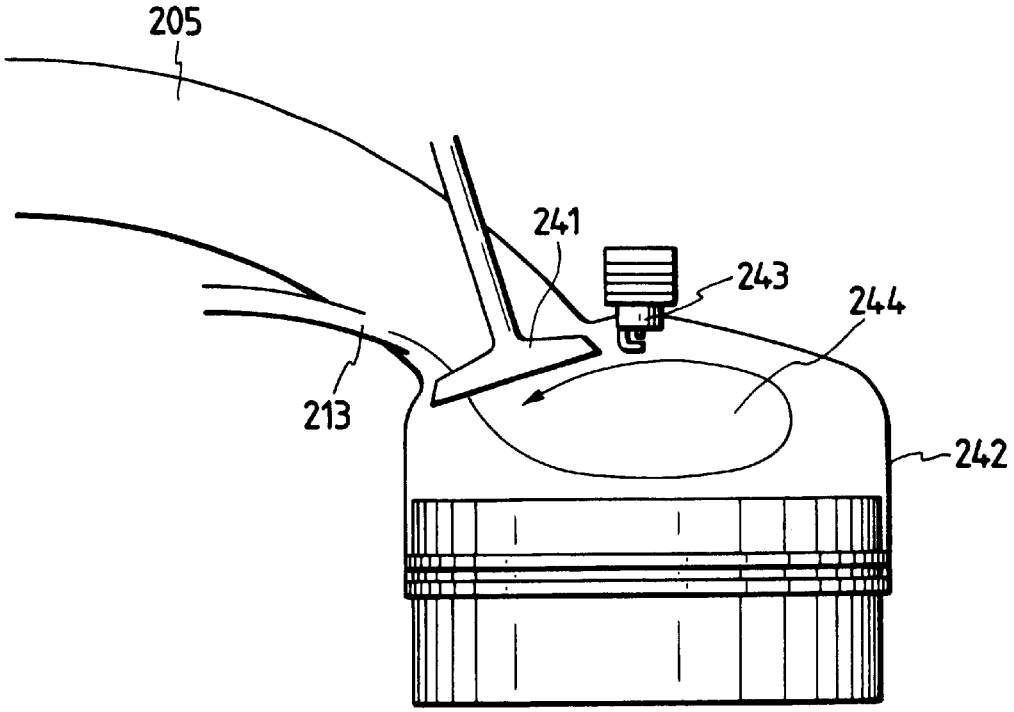
FIG. 9 is a still another schematic structural embodiment of an auxiliary gas passage outlet port opened into a main air passage near a gas intake valve for an engine cylinder which is included in the air intake arrangements according to the present invention.

FIG. 9 is a still another embodiment wherein the auxiliary gas passage outlet port 213 is disposed eccentrically toward the lower side of the independent air intake conduit 205. With this structure, the auxiliary gas passes the air intake valve 241 and induces a tumble moving in an opposite direction as that of FIG. 8. At this instance, when fuel is injected from a fuel injection valve (not shown) only toward one of the two air intake valves 241, a mixture gas is formed only in a partial region of the combustion chamber 244 covered by the one air intake valve 241 located at one side. Thereby a stratification of the mixture gas in the combustion chamber 244 is achieved and a sufficiently combustible fuel lean mixture gas is obtained. Further, in an engine compression stroke the tumbles are collapsed and a multiplicity of small turbulences are generated such that a combustion speed is improved even with the fuel lean mixture gas.

Figure 10:
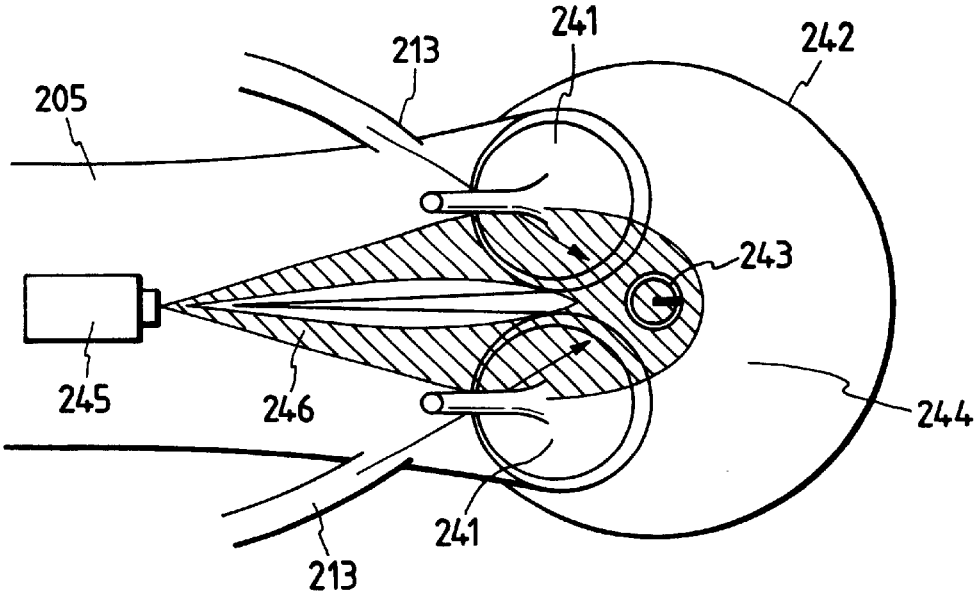
FIG. 10 is a further schematic structural embodiment of an auxiliary gas passage outlet port opened into a main air passage near a gas intake valve for an engine cylinder which is included in the air intake arrangements according to the present invention.

FIG. 10 is a further embodiment wherein a pair of auxiliary gas passage outlet ports 213 are provided on the right and left sides of the independent air intake conduit 205 near the end thereof. The respective passage outlet ports 213 are directed toward the center of the combustion chamber 244. Further, the atomized fuel from the fuel injection valve 245 is adapted to collide with the gas flow from the auxiliary gas passage outlet ports 213. With this structure, an easily ignitable fuel rich mixture gas is formed at the center portion of the combustion chamber 244, therefore, when the ignition plug 243 is disposed at such region a desirable ignition and combustion are achieved even when a mixture gas of a fuel lean air/fuel ratio as a whole is charged into the combustion chamber 244. Further, if the atomized fuel 246 from the fuel injection valve 245 can be concentrated at the center of the combustion chamber 244, the auxiliary gas passage outlet ports 213 are not necessarily provided on both sides of the independent air intake conduit 205, instead only a single auxiliary gas passage outlet port 213 can be disposed eccentrically toward upper side or lower side of the independent air intake conduit 205 for obtaining substantially the same advantages as above.

Figure 11:
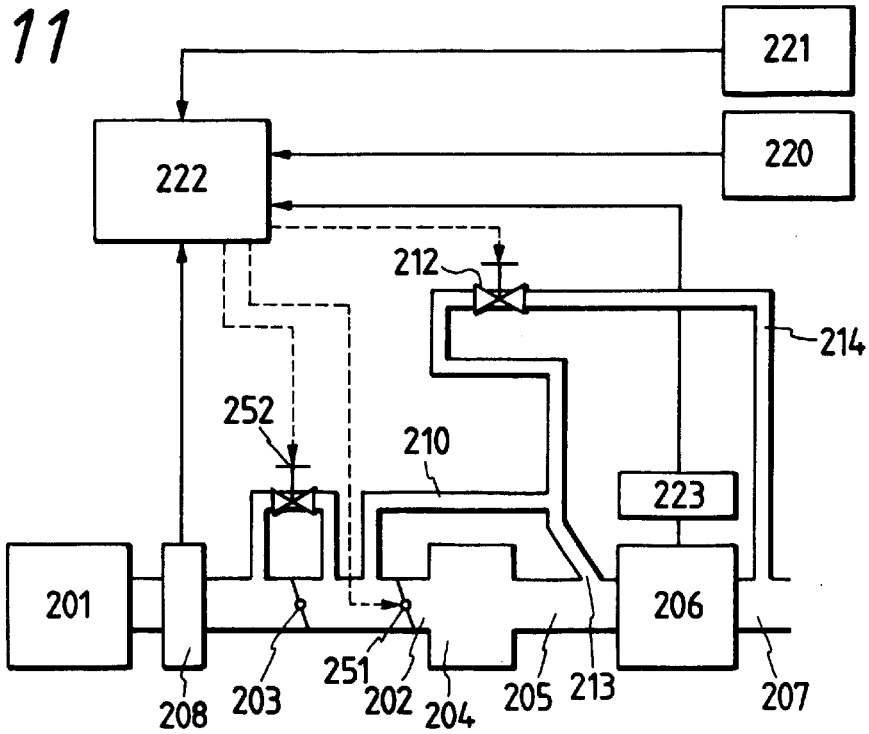
FIG. 11 is a schematic fluidic system diagram of a second embodiment of air intake arrangements for an internal combustion engine according to the present invention.
Figure 12:
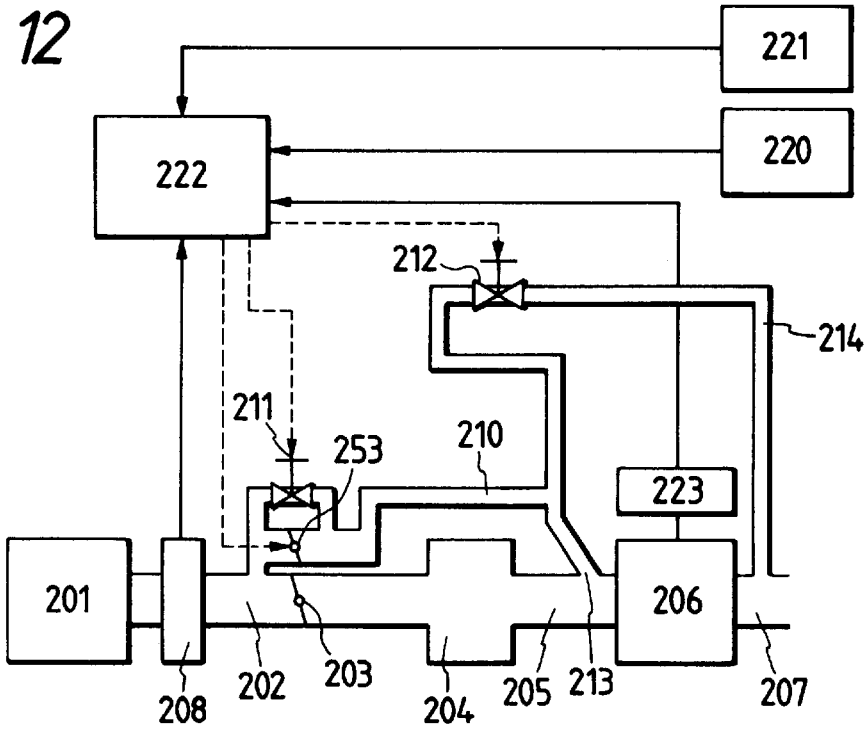
FIG. 12 is a schematic fluidic system diagram of a third embodiment of air intake arrangements for an internal combustion engine according to the present invention.
Figure 13:
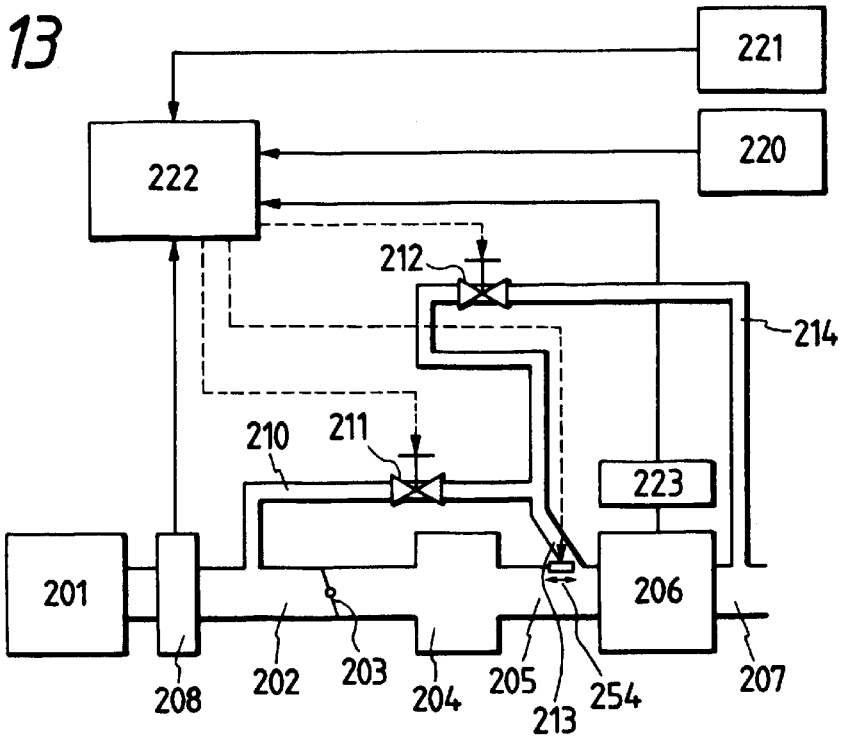
FIG. 13 is a schematic fluidic system diagram of a fourth embodiment of air intake arrangements for an internal combustion engine according to the present invention.

FIG. 11 through FIG. 13 show further embodiments having modified auxiliary gas passage structures.

In FIG. 11 embodiment, inlet air is introduced through an air cleaner 201, and after being measured the flow rate thereof by an air flow meter 208, the amount of the inlet air is adjusted by a throttle valve 203 and the dividing ratio of the inlet air for a main passage 202 and an auxiliary gas passage 210 is adjusted by an intake air control valve 251. The intake air control valve 251 is designed either to open in synchronism with the throttle valve 203 but with a predetermined delay or to open when the intake air negative pressure reaches to a predetermined value near the atomospheric pressure to thereby adjust a swirling strength. With such structure, amount of air passing through an auxiliary air control valve 252 for an idling operation and for a torque-up operation for driving engine accessories can be reduced, thereby manufacturing cost of the arrangement is reduced. Further, since the intake air control valve 251 is disposed upstream the collector 204, it is not necessary to provide many intake air control valves corresponding to the number of engine cylinders as in the conventional arrangement, but only one intake air control valve 251 is satisfactory. Accordingly, manufacturing cost of the arrangement is again reduced. With the present embodiment, since the inner volume of the auxiliary gas passage 210 is also designed small in comparison with the total volume of the main gas passage 202 including the collector 204 and the independent air intake conduits for the respective engine cylinders, an improvement of the response characteristic of the auxiliary gas and an inducement of a gas swirl having a necessary strength are of course obtained.

FIG. 12 is an embodiment wherein an auxiliary throttle valve 253 is provided in the auxiliary gas passage 210 so as to bypass the intake air control valve 211. In the present embodiment, the intake air control valve 211 is used for controlling air amount for an idling operation and for a torque-up operation and the auxiliary throttle valve 253 is used for adjusting the flow rate of air used for inducing a gas swirl in a fuel lean air/fuel ratio operating region, thereby the capacity of the intake air control valve 211 can be reduced and the manufacturing cost of the arrangement is lowered. Likely, with the present structure, an improvement of the response characteristic and an inducement of the gas swirl of a necessary strength can also be obtained.

FIG. 13 is an embodiment wherein a throttle nozzle 254 is provided at the auxiliary gas passage outlet port 213, and the fundamental structure and the operation thereof are substantially the same as those explained in connection with FIG. 1 through FIG. 6. In the present embodiment, when an opening degree of the throttle valve 203 is small and a flow rate of the auxiliary air is small such as in an idling region, the auxiliary gas passage outlet port 213 is restricted by the throttle nozzle 254 to thereby increase a flow velocity of the auxiliary air and to increase the gas swirl strength, as a result, a stable combustion is achieved even when the combustion is effected with a fuel lean air/fuel mixture gas. Likely, in the present embodiment, since the inner volume of the auxiliary gas passage 210 is determined smaller than the totaled volume of the main air passage 202 including the collector 204 and the independent intake air conduits 205 for the respective engine cylinders, an improved response characteristic of the auxiliary gas is of course obtained.

Figure 14:
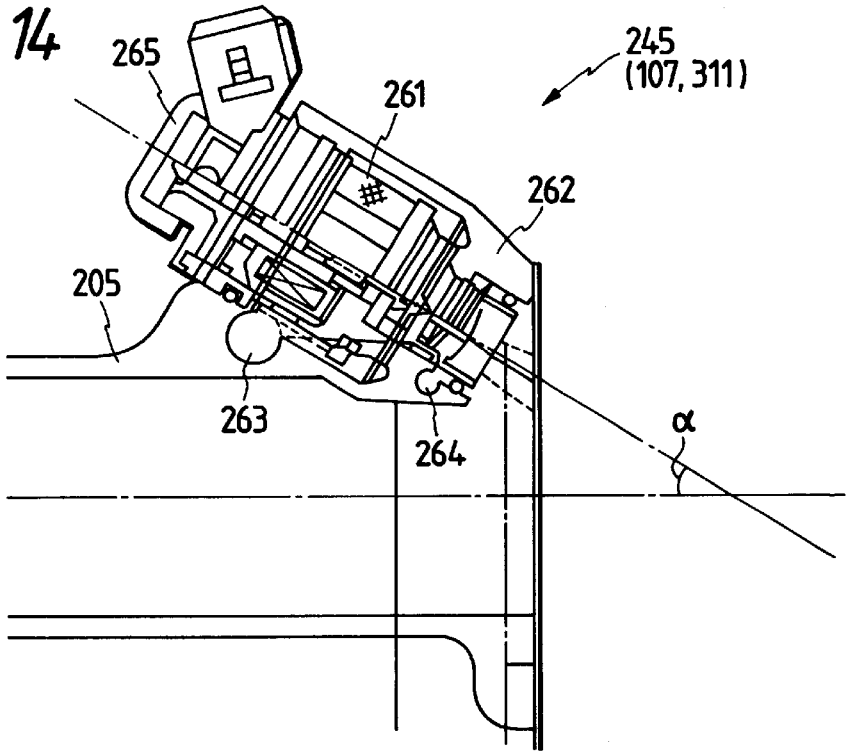
FIG. 14 is a structural embodiment of a main air passage at a portion where a fuel injection valve is mounted which is included in the air intake arrangements according to the present invention.

FIG. 14 shows a structural embodiment of the independent intake air conduit 205 with an integrated fuel injection valve fitting arrangement.

All of a mounting portion 262, a fuel piping 263 and an air piping 264 for fuel atomization for the fuel injection valve are structurally integrated with the independent air intake conduit 205. The fuel injection valve 261 is secured to the independent air intake conduits 205 via a stopper 262. Through the integration of the mounting portion 262, the fuel piping 263 and the air piping 264 for fuel atomization for the fuel injection valve with the independent air intake conduit 205, the fuel injection valve 261 can be located near the center axis of the air intake conduit 205 in comparison with the conventional arrangement wherein the four parts are separately manufactured so that an angle $\alpha$ formed by the fuel atomization axis and the center axis of the intake air conduit 205 can be decreased. Further, the air intake conduit 205 can be optimally designed so as to meet a spreading configuration of the atomized fuel and to reduce a deposition rate of the atomized fuel injected from the fuel injection valve 261 on the inner wall of the air intake conduit 205. As a result, the fuel deposition on the air intake conduit 205 is reduced.

Figure 15:
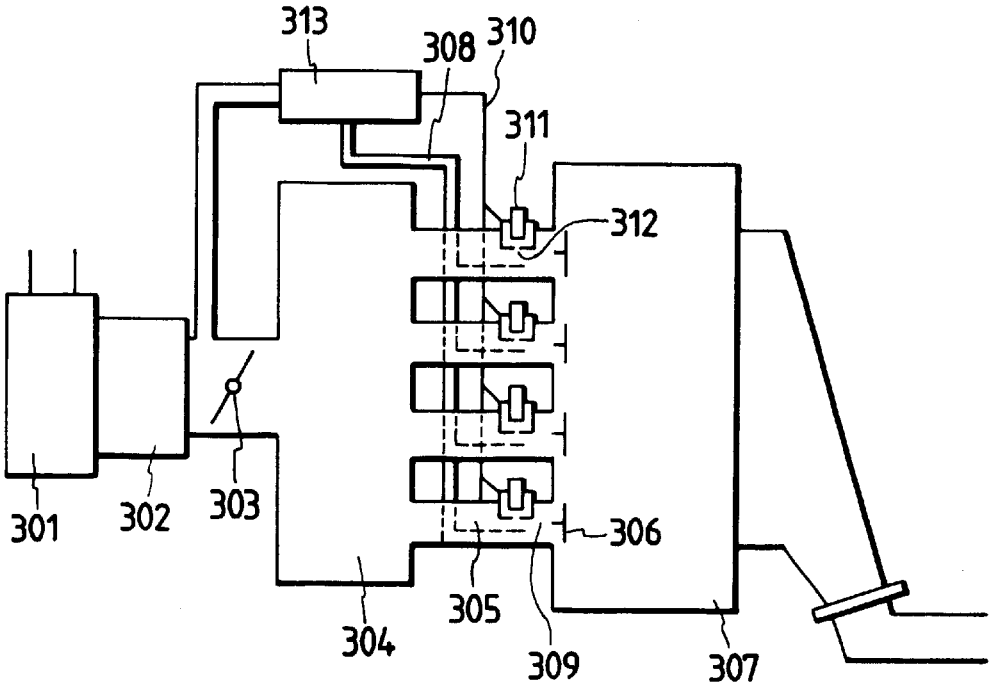
FIG. 15 is a similar schematic fluidic system diagram to the first embodiment shown in FIG. 1 when applied to a four cylinder internal combustion engine

FIG. 15 shows a further embodiment of the present invention similar to FIG. 1 embodiment. Air is taken-in into a collector 304 via an air cleaner 301, an air flow rate sensor 302 and a throttle valve 303, further the air passes through independent air intake conduits 305 for the respective engine cylinders and is taken-in into the respective combustion chambers of the engine 307 via air intake valves 306. A passage 308 bypassing the throttle valve 303 is provided through which air is supplied to a gas intake port 309 of the respective independent air intake conduits 305. The flow velocity of the air bypassing the throttle valve 303 is higher than the main air flowing through the independent air intake conduits 305. The outlet of the bypass passage 308 is opened so as to provide a drift current for the air flow in the gas intake port 309. The upstream inlet of the bypass passage 308 opens at the upstream of the throttle valve 303. Further, another bypass passage 310 branching from the bypass passage 308 is provided. The passage 310 is used for supplying air for fuel atomization to a fuel injection portion 312 of a fuel injection valve 311. The outlets of the bypass passage 308 open to the independent gas intake ports 309 for the respective engine cylinders. A flow rate control valve 313 is provided in the bypass passages 308 and 310 and is designed to control the amount of air flowing therethrough depending on engine operating conditions. The flow rate control valve 313 is actuated by an electrical signal. As indicated above, since the outlet portion of the bypass passage 308 is arranged eccentrically with respect to the gas intake port 309, a drift current is caused in the air flow. As a result, a gas swirl is formed in the combustion chamber and the combustion during a fuel lean air/fuel ratio operation is stabilized. Further, since air for an idle speed control and for a fast idle control is also supplied via the control valve 313, the combustion during an idling operation and a starting-up operation is improved and an amount of emission of unburnt hydrocarbon is reduced. Still further, an air/fuel ratio during an idling operation and a starting-up operation can be set at a fuel lean air/fuel ratio, which is effective for the reduction of fuel cost and for the reduction of unburnt hydrocarbon emission.

Figure 16A:
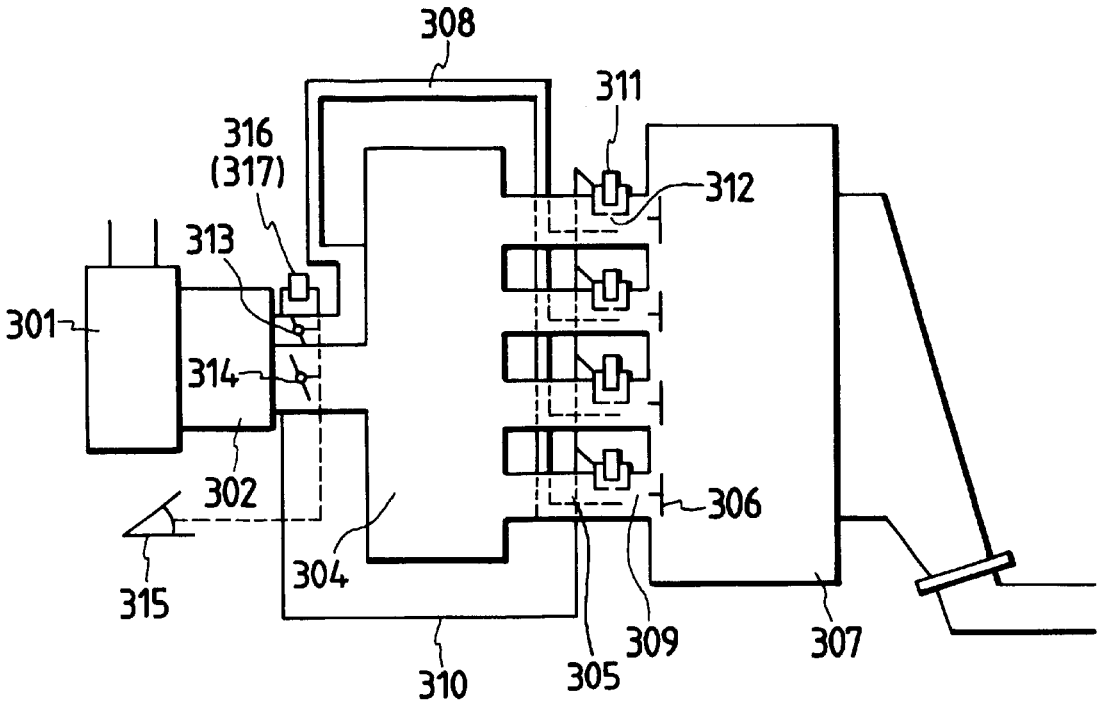
FIG. 16(a) is a similar schematic fluidic system diagram to the third embodiment shown in FIG. 12 when applied to a four cylinder internal combustion engine.
Figure 16B:
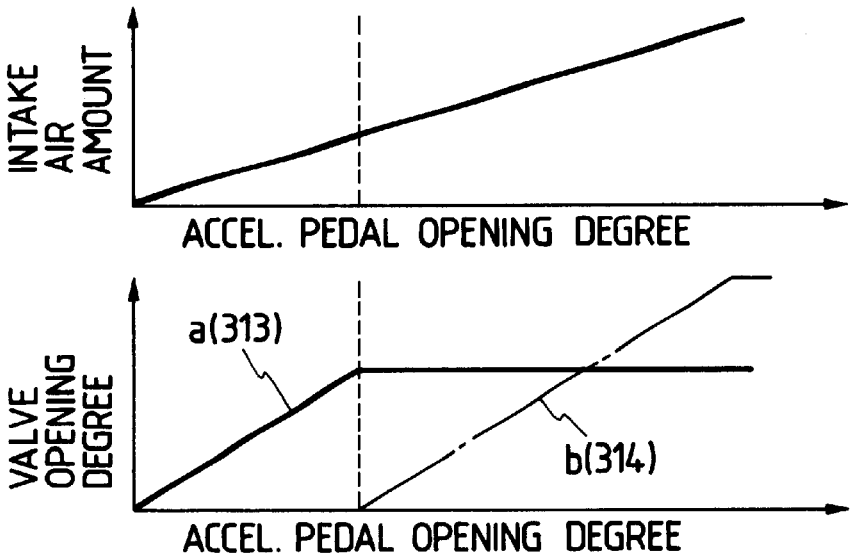
FIG. 16(b) is a graph illustrating a variation in intake air amount into an engine cylinder and opening degrees of an auxiliary intake air control valve 313 and of a throttle valve 314 in FIG. 16(a) embodiment depending on an opening degree of an acceleration pedal 315.

FIG. 16(a) shows a still another embodiment of the present invention similar to FIG. 12 embodiment, wherein two throttle valves 313 and 314 are provided, and are constituted respectively for supplying air for the bypass passage 308 which is designed to supply air to the gas intake port 309 and for the bypass passage 310 which is designed to supply air for atomizing fuel injected from the fuel injection valve 311. The inlet port of the bypass passage 310 opens at the upstream of the throttle valve 314. The respective throttle valves 313 and 314 are mechanically linked with an acceleration pedal 315. The throttle valve 313 is at first opened in response to depression of the acceleration pedal 315. After the throttle valve 313 is fully opened, the throttle valve 314 begins to open of which operation sequence is illustrated in FIG. 16(b) wherein curve a shows an opening degree of the throttle valve 313 and curve b of the throttle valve 314. During a fuel lean air/fuel ratio operation, air is taken in through the throttle valve 313 and the bypass passage 308. Accordingly, a swirling is induced in the intake gas and the combustion is stabilized. When the acceleration pedal 315 is depressed beyond a predetermined degree, air passing through the throttle valve 314 is also taken-in. Although under such condition, combustion with a fuel lean air/fuel mixture gas is possible because air flowing at a high velocity is supplied via the bypass passage 308. However, in response to opening operation of the throttle valve 314 the operation at a fuel lean air/fuel ratio can be returned to the operation at a normal air/fuel ratio. With the present embodiment, the supply of a high velocity gas is controlled via a mechanical actuating operation. A control valve 316 for an idle speed control is arranged so as to bypass the throttle valve 313 or 314. However, in order to improve combustion during an idling operation it is preferable to arrange the control valve 316 for the idle speed control so as to bypass the throttle valve 313. Further, it is also preferable to arrange a control valve 317 for a fast idle control so as to bypass the throttle valve 313. With thus constituted arrangement, the combustion during starting-up and idling operations is improved and emission amount of unburnt hydrocarbon is reduced. According to the present embodiment, since air flows through the passage 308 until an opening degree of the acceleration pedal 315 reaches the predetermined degree, an operation at a fuel lean air/fuel ratio is possible.

Figure 17:
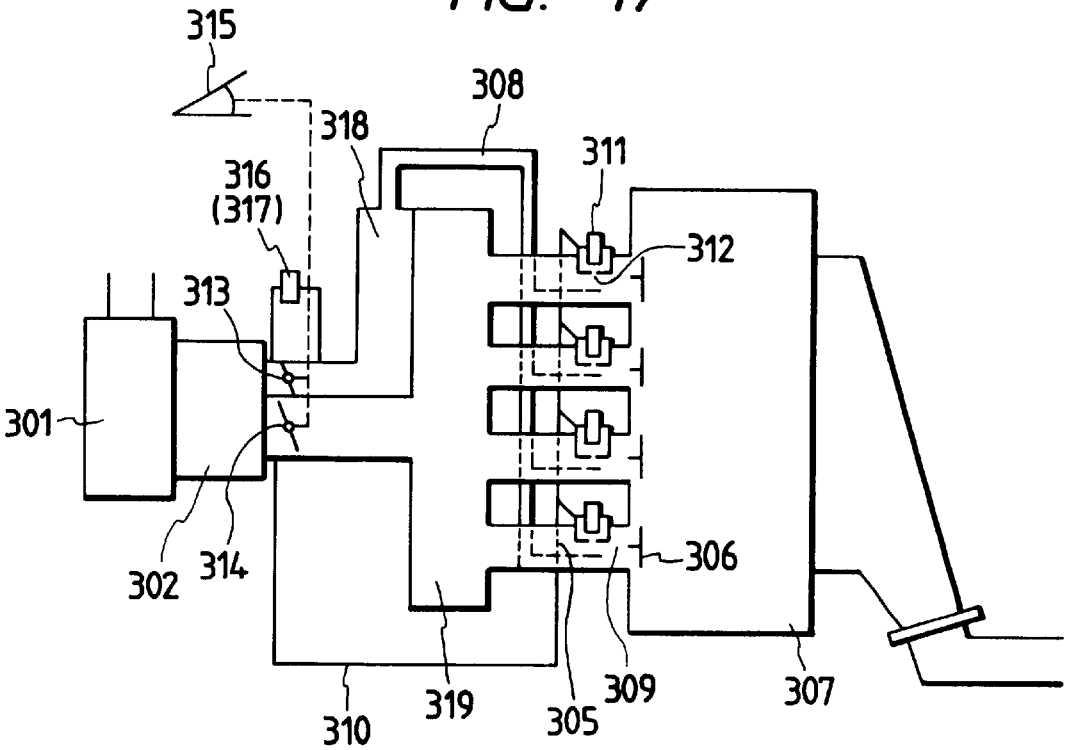
FIG. 17 is a schematic fluidic system diagram of a fifth embodiment of air intake arrangements for an internal combustion engine according to the present invention.

FIG. 17 shows a still another embodiment of the present invention, wherein a collector 318 having a larger passage area than the bypass passage 308 is provided in the bypass passage 308 connected to the throttle valve 313. With such constitution, an intake air inertia effect is induced in the bypass passage 308 and torque at a low engine rpm is increased. Further, air passing through the throttle valve 314 is introduced into a conventional collector 319. For the air passing through the throttle valve 314, an intake air inertia effect is likely induced by means of the collector 319.

The map illustrating air/fuel ratio settings shown in FIG. 2(a) is again explained. During idling operation in region I an air/fuel ratio, namely excess air ratio $\lambda$ is set near 1. Further, under light load condition in region II, the air excess rate is set at $\lambda>1.0$ i.e. a fuel lean air/fuel ratio. Outside this region, since an importance is placed on an engine output, the air/fuel ratio is set at $\lambda=1$ i.e. stoichiometric air/fuel ratio. A further outer region constitutes a powering range wherein the air/fuel ratio is set at $\lambda<1.0$ i.e. a fuel rich air/fuel ratio. Air for inducing a gas swirl in the combustion chamber is introduced in an operating condition in region II wherein an air/fuel ratio is set at $\lambda>1.0$ i.e. a fuel lean air/fuel ratio. As indicated above, since even during an idling opeartion air bypassing the throttle valve is introduced as an idle speed control (ISC) use into the gas intake port, the combustion during a starting-up operation and idling operation is improved. In FIG. 2(a), the air/fuel ratio in the region I corresponding to the idling operation is set at $\lambda=1$ however by means of the above combustion improving effect the air/fuel ratio can be set at $\lambda>1.0$ i.e. a fuel lean air/fuel ratio. FIG. 2(b) shows an example of maps of opening degree of the control valves for the bypassing air in regions I and II. Under an idling operation region I, amount of air is controlled by making use of a control valve for ISC. Further, under a light load operation region II, amount of bypassing air is controlled by making use of a separate air control valve wherein the opening degree of the control valve is varied depending on a required air amount of the engine.

Although, the map of FIG. 2(b) shows a use of the separate control valves for region I and region II, a common control valve can be used for both regions I and II as illustrated in FIG. 1 embodiment.

Figure 18A:
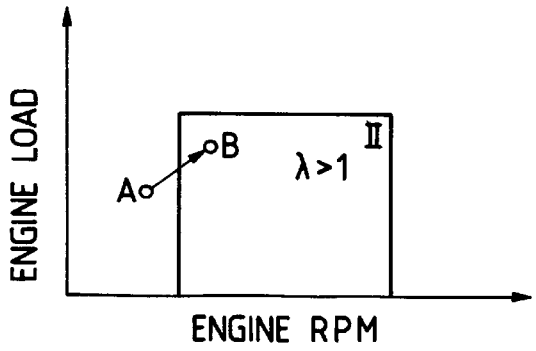
FIG. 18(a) illustrates a change of an engine operating condition from region III to region II on the map shown in FIG. 2(a)
Figure 18B:
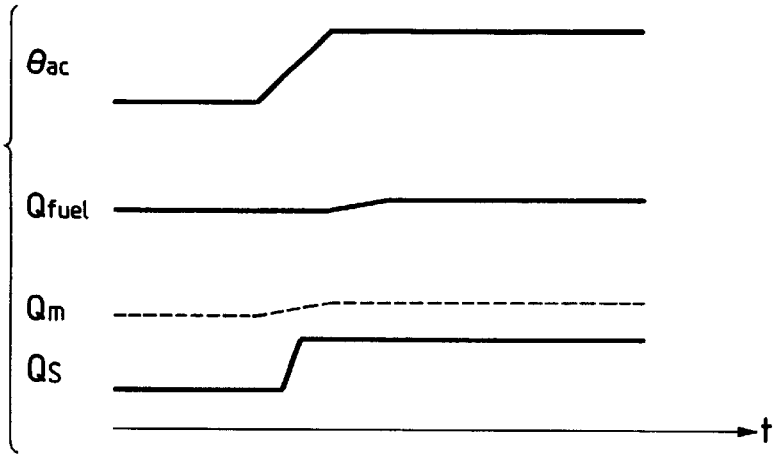
FIG. 18(b) illustrates variations of an angle of the acceleration pedal, an amount of fuel injected, an amount of air supplied via the main air passage and an amount of air supplied via the auxiliary gas passage with respect to time in one of the embodiments of the air intake arrangements according to the present invention in response to the change illustrated in FIG. 18(a)

FIG. 18(a) and FIG. 18(b) are views for explaining an operation of the control valve 313. FIG. 18(a) is a diagram illustrating a change of engine operating condition from point A to point B wherein the acceleration pedal is depressed and the engine operating region is moved into the region II corresponding to a fuel lean air/fuel ratio. FIG. 18(b) shows changes of control variables with respect to time in response to the engine operating condition change, $\theta$ ac designates a depression angle of the acceleration pedal and in the drawing the depression angle is increased which represents an acceleration condition. Immediately after the operating condition moves into the region operating at a fuel lean air/fuel ratio, the base fuel injection amount is fixed to the previous value. However, since the air/fuel ratio is set at a fuel lean air/fuel ratio, amount of bypassing air is increased to settle at the set air/fuel ratio. In the drawing, Qm and Qs respectively represent the main air amount and the bypassing air amount flowing through the respective air intake passages at this moment. Immediately after the engine operating condition moves into the region II of a fuel lean air/fuel ratio, the bypassing air amount Qs is increased to shift the air/fuel ratio into a fuel lean air/fuel ratio. The main air amount Qm is increased in response to the depression angle of the acceleration pedal. The bypassing air amount Qs can be understood to be an air amount necessary for shifting the air/fuel ratio into a fuel lean air/fuel ratio. When assuming that Qf represents a fuel amount with which the stoichiometric air/fuel ratio will result in with respect to the air amount immediately before the acceleration pedal is depressed, the increasing portion in Qs corresponds to an air amount used for shifting the air/fuel ratio from the stoichiometric air/fuel ratio to the fuel lean air/fuel ratio. With such measure a shifting of engine operating condition from the stoichiometric air/fuel ratio operation to a fuel lean air/fuel ratio operation is smoothly performed.

Figure 19A:
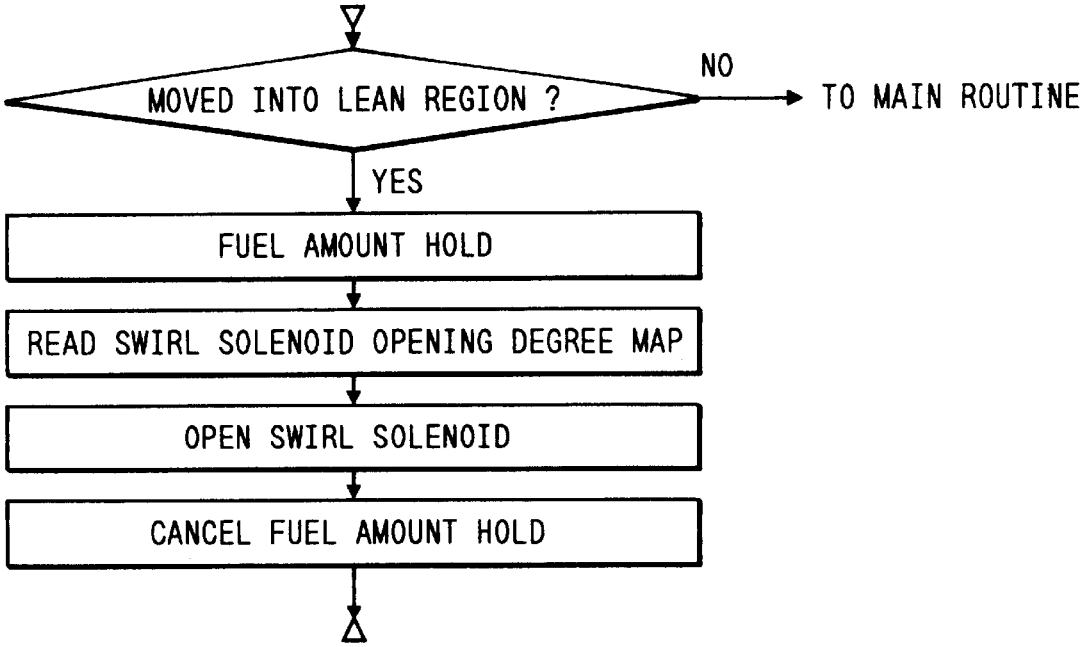
FIG. 19(a) is a flow chart illustrating a control sequence performed in one of the embodiments of the air intake arrangements according to the present invention immediately after detecting the change as illustrated in FIG. 18(a)
Figure 19B:
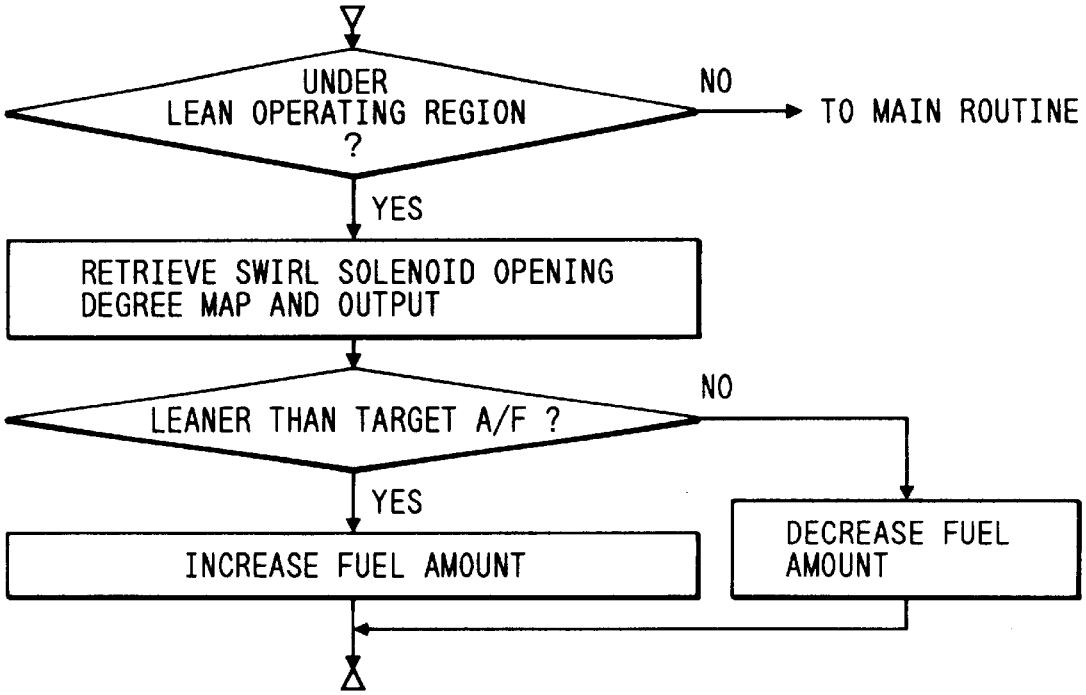
FIG. 19(b) is a flow chart illustrating a control sequence performed in one of the embodiments of the air intake arrangements according to the present invention after the control sequence shown in FIG. 19(a) has terminated.

FIG. 19(a) shows a control flow chart of the above explained control sequence. First, it is judged whether the engine operating condition moved into a fuel lean air/fuel ratio region. When it is judged that the condition moved into a region permitting a fuel lean air/fuel ratio operation, the fuel amount is temporarily hold unchanged. Subsequently, an opening degree of the control valve (hereinafter called as swirl solenoid) 313 is retrieved on a map and the swirl solenoid is actuated according to the map retrieved opening degree, and after completing the above operation, the fuel amount holding is canceled. Thereafter, the process moves to another operation flow in a fuel lean air/fuel ratio operating region as shown in FIG. 19(b), wherein at first it is judged whether the engine operating condition still stays in the fuel lean air/fuel ratio operating region and when it is judged that the condition stays under the fuel lean air/fuel ratio operating region, the swirl solenoid opening degree map is retrieved and the retrieved value is output. Thereafter, it is judged whether the air/fuel ratio reaches a target air/fuel ratio and if the actual air/fuel ratio is in a fuel lean side with respect to the target air/fuel ratio, the fuel amount is increased, and if the actual air/fuel ratio is in a fuel rich side with respect to the target air/fuel ratio, the fuel amount is decreased. Namely, after the swirl solenoid has been opened to a target opening degree, the air/fuel ratio control is performed by increasing or decreasing the fuel amount.

Figure 20:
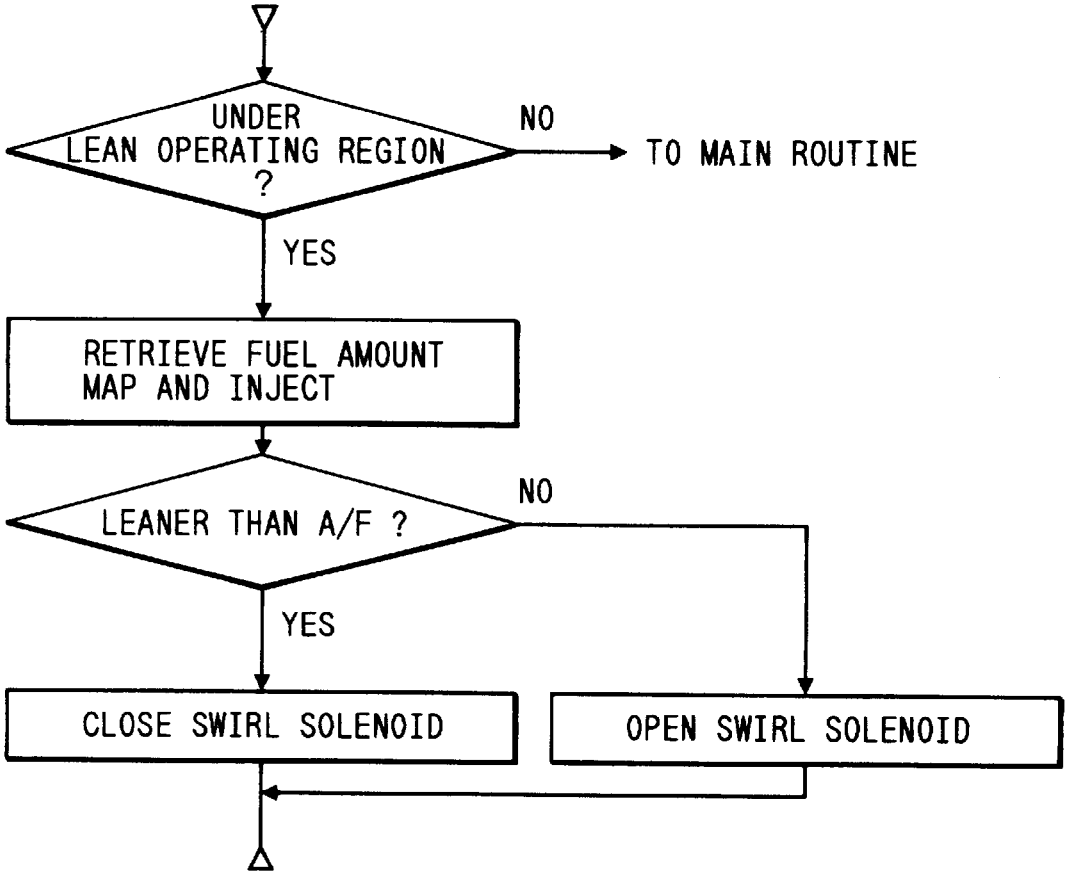
FIG. 20 is a flow chart illustrating a modified control sequence of that shown in FIG. 19(b)

FIG. 20 shows a modified control sequence of air/fuel ratio of that shown in FIG. 19(b). When it is judged that the engine operating condition is in a fuel lean air/fuel ratio operating region, a fuel injection amount is map-retrieved and the map-retrieved fuel amount is injected from the fuel injection valve. Thereafter, it is judged whether the actual air/fuel ratio reaches to a target air/fuel ratio, and if actual air/fuel ratio is determined in fuel lean side with respect to the target air/fuel ratio, the swirl solenoid is closed to move the air/fuel ratio toward fuel rich side, and further, if the actual air/fuel ratio is determined in fuel rich side with respect to the target air/fuel ratio, the swirl solenoid is opened to move the air/fuel ratio toward fuel lean side. Namely, in the present control method, the air/fuel ratio is adjusted by varying air amount via the opening degree control of the swirl solenoid. An example of judging methods whether the actual air/fuel ratio reaches to a target air/fuel ratio used in the methods exemplified in FIG. 19(b) and FIG. 20 is one in which the judgement is made based on a detected value from an air/fuel ratio sensor detecting exhaust gas.

Other than the air/fuel ratio sensor detecting exhaust gas, a sensor for detecting engine roughness can be used for determining air/fuel ratio.

The engine roughness can be determined either based on a combustion pressure variation detected by a combustion pressure sensor attached to the combustion chamber, based on an engine rpm variation detected by such as a crank angle sensor attached to the cam shaft and a ring gear sensor, or based on a knock magnitude detected by a knock sensor attached to an engine block.

Figure 21:
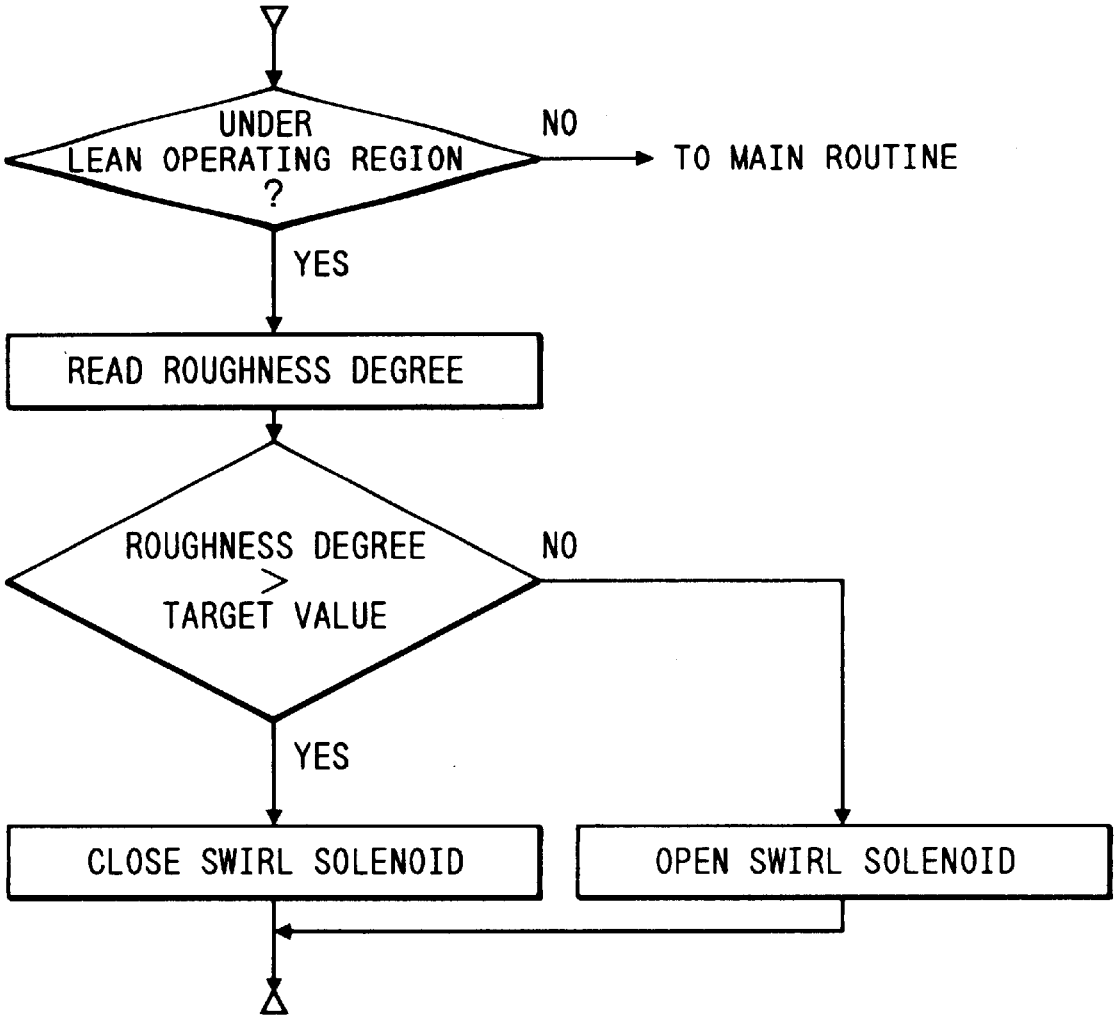
FIG. 21 is a flow chart illustrating another modified control sequence using an engine roughness signal of that shown in FIG. 19(b)

FIG. 21 shows a further air/fuel ratio control sequence which makes use of an engine roughness sensor. When it is determined that the engine operating condition is in a fuel lean air/fuel ratio operating region, a detected value of engine roughness degree is read. The engine roughness is determined by making use of one of the above methods and when the detected engine roughness is larger than a target value, it is judged that the present air/fuel ratio reaches a limit of fuel lean air/fuel ratio and the swirl solenoid is closed and the air/fuel ratio is shifted toward fuel rich side. Contrary, when the detected engine roughness is smaller than the target value, the swirl solenoid is opened and the air/fuel ratio is shifted toward fuel lean side. Thus operating the swirl solenoid in dependence upon the engine roughness, the engine is allowed to operate always at a fuel lean limit of air/fuel ratio.

Figure 22:
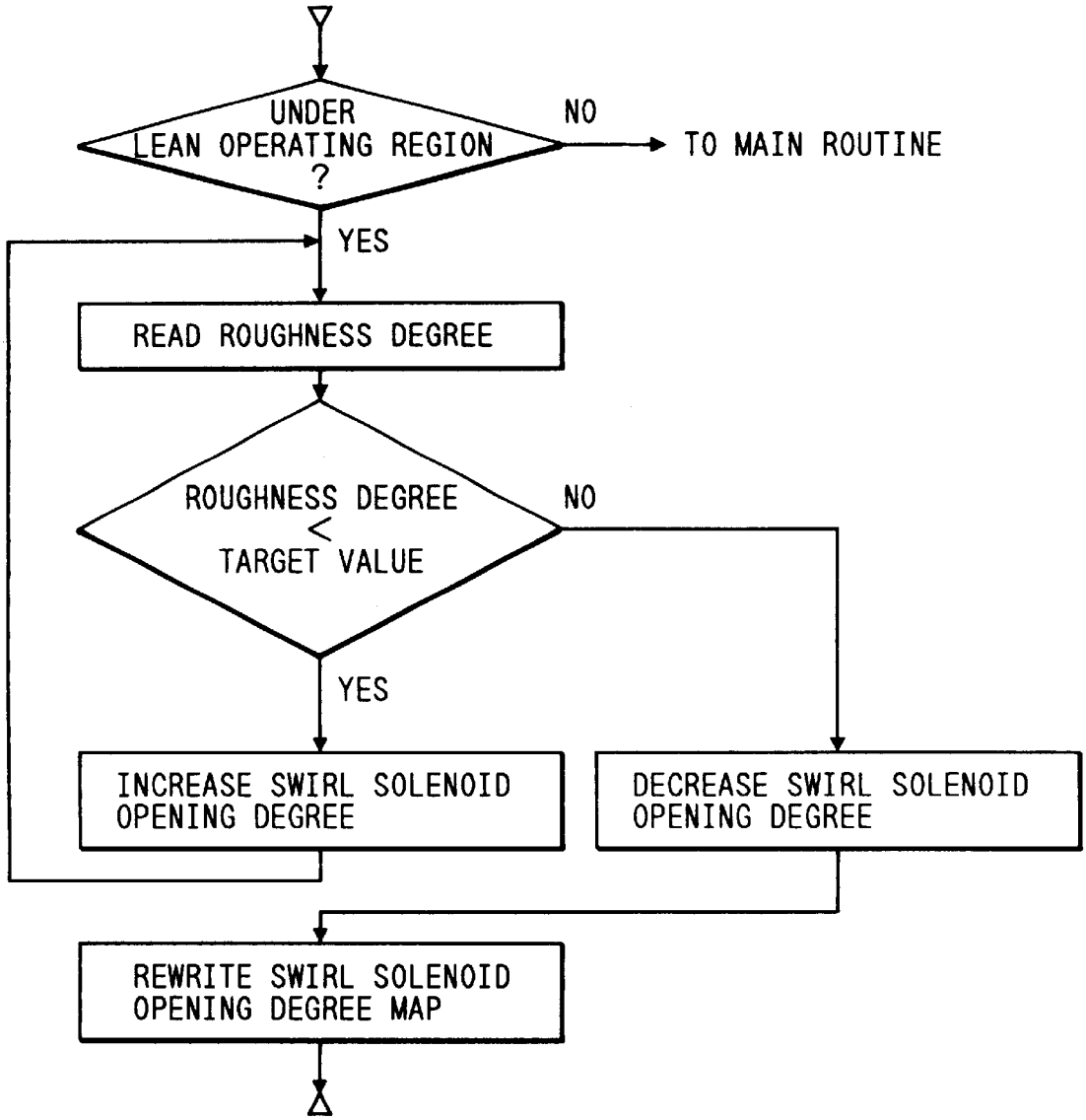
FIG. 22 is a flow chart illustrating a modified control sequence incorporating a learning function of a swirl solenoid opening degree of that shown in FIG. 21.

FIG. 22 shows a further modified air/fuel ratio control sequence incorporating a learning function of a swirl solenoid opening degree. After detecting an engine roughness, the detected engine roughness is judged smaller than a target value, the opening degree of the swirl solenoid is increased and the engine roughness is again judged. At this instance, when the detected engine roughness exceeds the target value, the opening degree of the swirl solenoid is slightly decreased and the opening degree of the swirl solenoid at that moment is rewritten on a map and stored. Namely, the newly stored opening degree of the swirl solenoid represents an air/fuel ratio close to the fuel lean limit of air/fuel ratio at this moment. With this method, the map is always maintained to represent an opening degree limit even when motor vehicle components such as the engine have suffered a secular change.

Figure 23A:
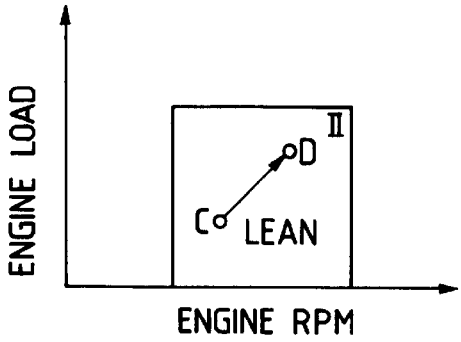
FIG. 23(a) illustrates a change of an engine operating condition within region II on the map shown in FIG. 2(a)
Figure 23B:
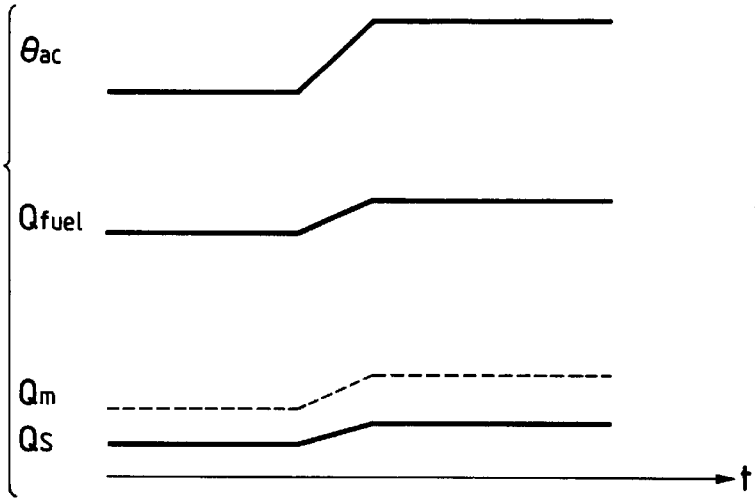
FIG. 23(b) illustrates variations of an angle of the acceleration pedal, an amount of fuel injected, an amount of air supplied via the main air passage and an amount of air supplied via the auxiliary gas passage with respect to time in one of the embodiments of the air intake arrangements according to the present invention in response to the change illustrated in FIG. 23(a)

FIG. 23(a) shows a diagram illustrating a change of engine operating condition from point C and to point D when the acceleration pedal is depressed during an engine operating condition at a fuel lean air/fuel ratio operating region II. In this instance, the fuel amount Qf also increases according to an increase of acceleration pedal angle θ ac as illustrated in FIG. 23(b). The increasing tendency of air amount at this moment is also illustrated by the air amount Qm of the main intake gas conduit and the air amount Qs of the auxiliary air passage 308 in FIG. 23(b). Both air amounts Qm and Qs are designed to increase at a predetermined rate in accordance with the increase of acceleration pedal angle θ ac. With such control a gas swirl having a predetermined strength is always obtained. Alternatively, the flow rate of Qm and Qs can be varied depending on engine rpm. In both cases, the control can be performed by storing optimum opening degrees of the swirl solenoid on the map having parameters of engine rpm and engine load as illustrated in FIG. 2(b).

Figure 24:
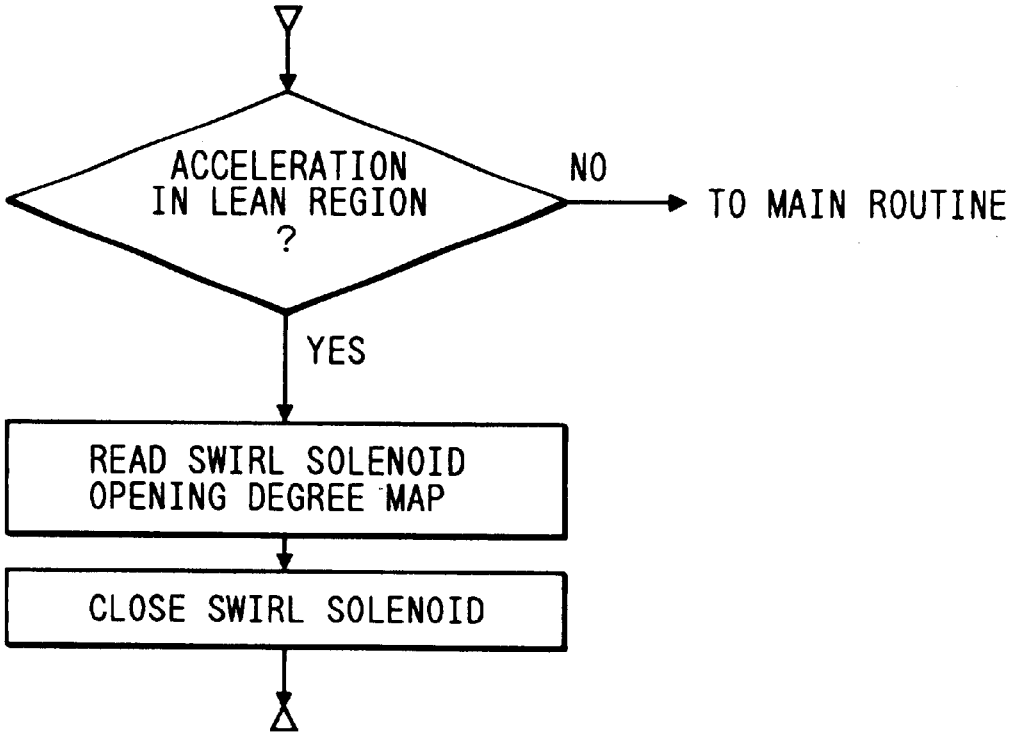
FIG. 24 is a flow chart illustrating a control sequence performed in one of the embodiments of the air intake arrangements according to the present invention immediately after detecting the change as illustrated in FIG. 23(a)

FIG. 24 shows a flow chart of the control sequence as explained above. At first, it is determined whether the engine is accelerated in a fuel lean air/fuel ratio operating region, and when the answer is yes, the swirl solenoid opening degree map is retrieved and the swirl solenoid is opened based on the retrieved opening degree, and an amount of fuel corresponding to the sum of Qm and Qs is injected, however at this moment the air/fuel ratio is set at fuel lean side, the amount of fuel injected corresponds to one at the set fuel lean air/fuel ratio.

Figure 25A:
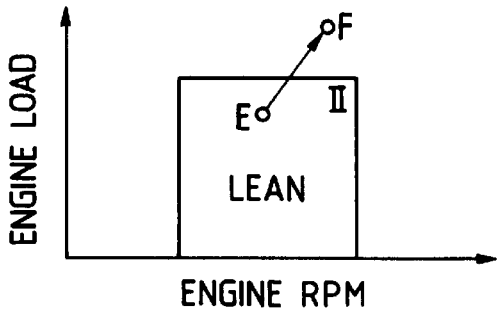
FIG. 25(a) illustrates a change of an engine operating condition from region H to region III on the map shown in FIG. 2(a)
Figure 25B:
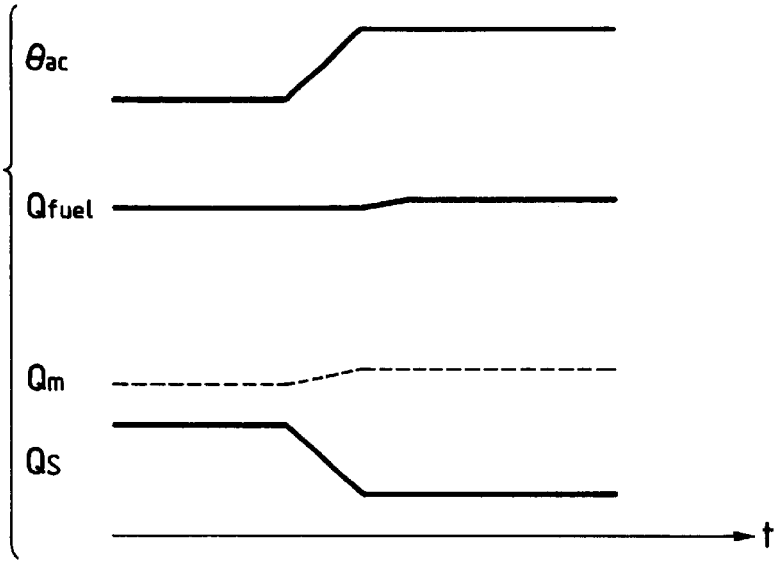
FIG. 25(b) illustrates variations of an angle of the acceleration pedal, an amount of fuel injected, an amount of air supplied via the main air passage and an amount of air supplied via the auxiliary gas passage with respect to time in one of the embodiments of the air intake arrangements according to the present invention in response to the change illustrated in FIG. 25(a)

FIG. 25(a) shows a diagram illustrating a change of engine operating condition from point E to point F, in that, when an engine operating condition changes from a fuel lean air/fuel ratio operating region to another air/fuel ratio operating region. As illustrated in FIG. 25(b), immediately after the engine operating condition moves out from a fuel lean air/fuel ratio operating region in response to an increase of acceleration pedal angle e ac, the fuel amount Qf is held unchanged. In this instance, a change of air/fuel ratio is performed by varying the air amount passing through the air passage 308. Namely, the air/fuel ratio is controlled by varying Qs while maintaining Qm substantially constant.

Figure 26:
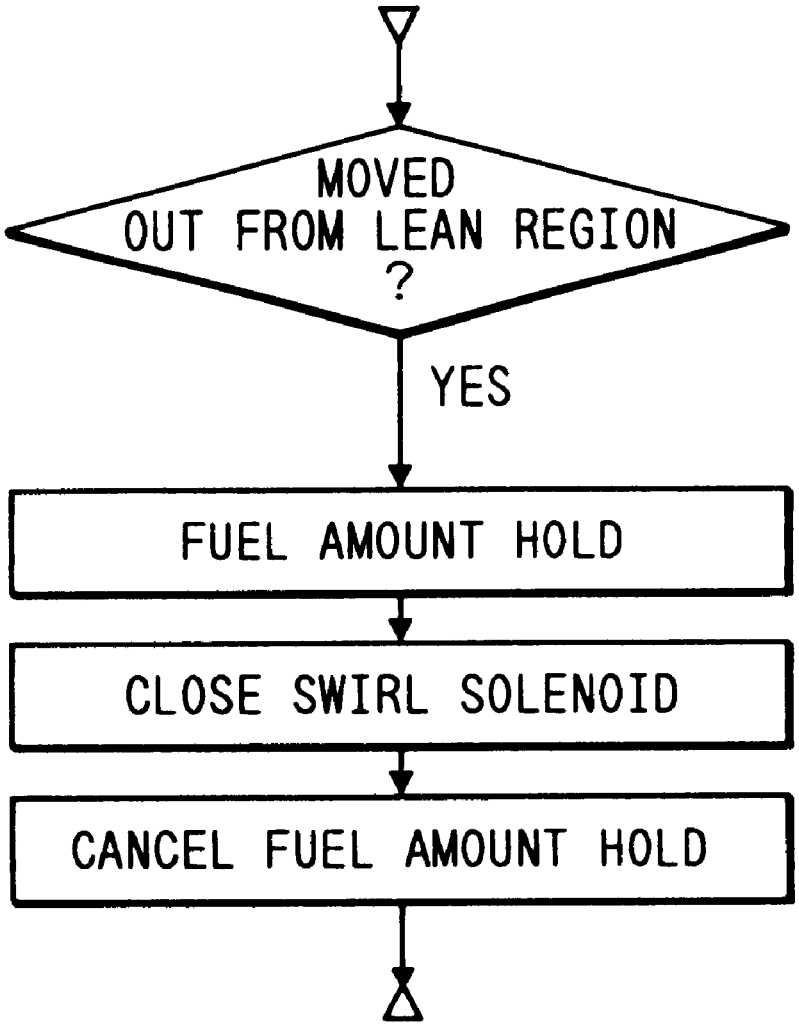
FIG. 26 is a flow chart illustrating a control sequence performed in one of the embodiments of the air intake arrangements according to the present invention immediately after detecting the change as illustrated in FIG. 25(a)

A flow chart of the control sequence at this instance is illustrated in FIG. 26. At first it is judged whether the engine operating condition has moved out from the fuel lean air/fuel operating region II, and when the answer is yes, the fuel injection amount is temporarily held unchanged. Thereafter, the opening degree of the swirl solenoid is decreased. After completing the above operation, the fuel injection amount holding is canceled. Thus the control is performed only by varying the air amount without varying the fuel amount, thereby a torque shock which may be caused during transition to another air/fuel ratio operating condition is reduced.

Figure 27:
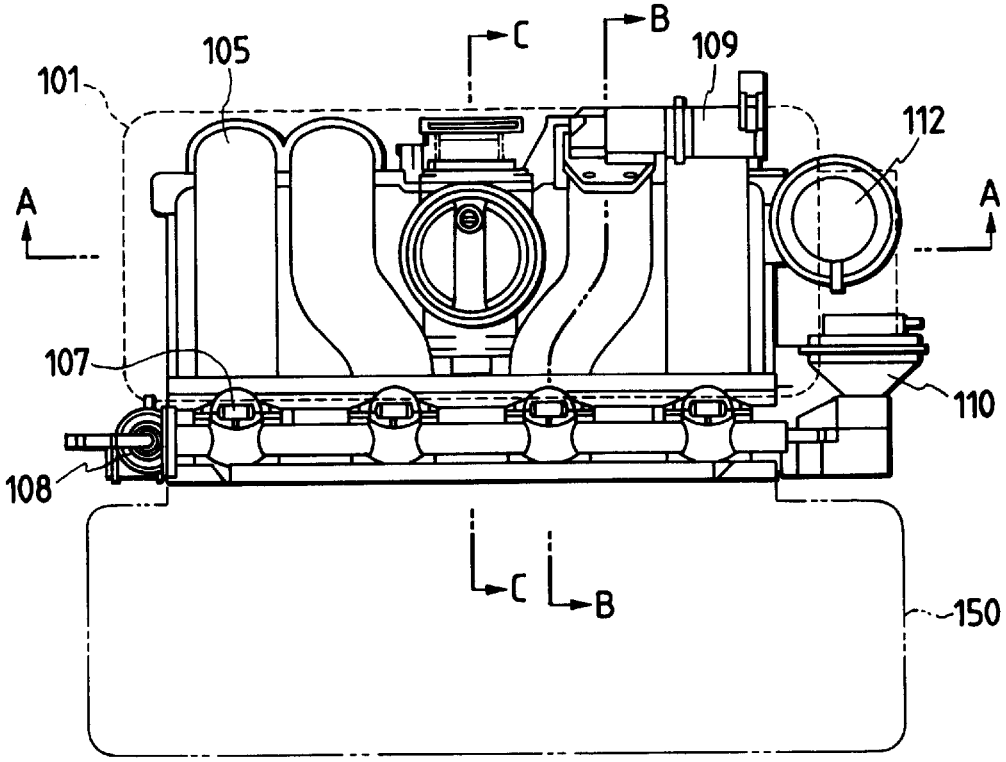
FIG. 27 is a top plane view of one structural embodiment of air intake arrangements according to the present invention which is realized based on one of the embodiments illustrated by the schematic fluidic system diagrams in FIG. 1, FIG. 11, FIG. 12, FIG. 13, FIG. 15, FIG. 16(a) and FIG. 17.
Figure 28:
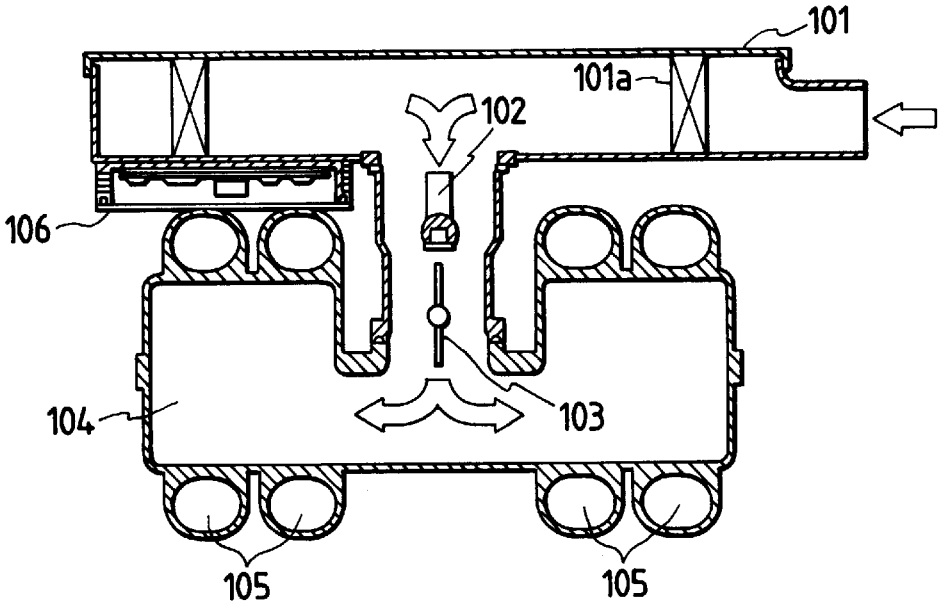
FIG. 28 is a cross sectional view taken along the line A—A in FIG. 27.
Figure 29:
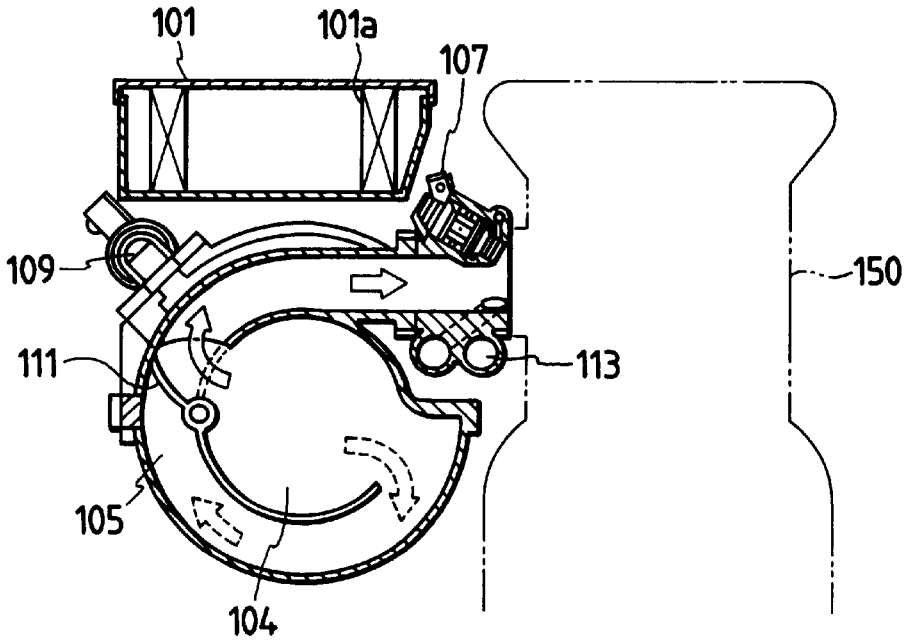
FIG. 29 is a cross sectional view taken along the line B—B in FIG. 27.
Figure 30:
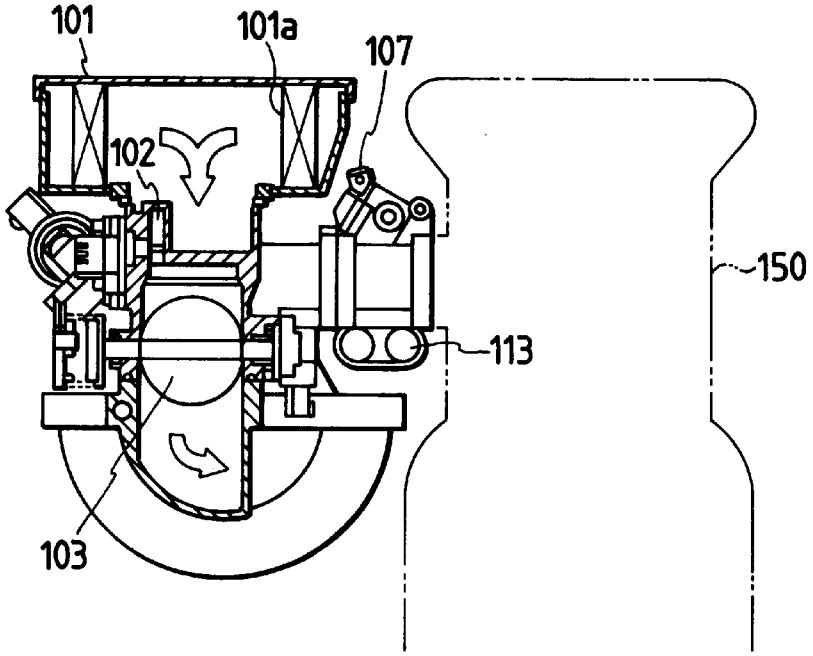
FIG. 30 is a cross sectional view taken along the line C—C in FIG. 27.
Figure 31:
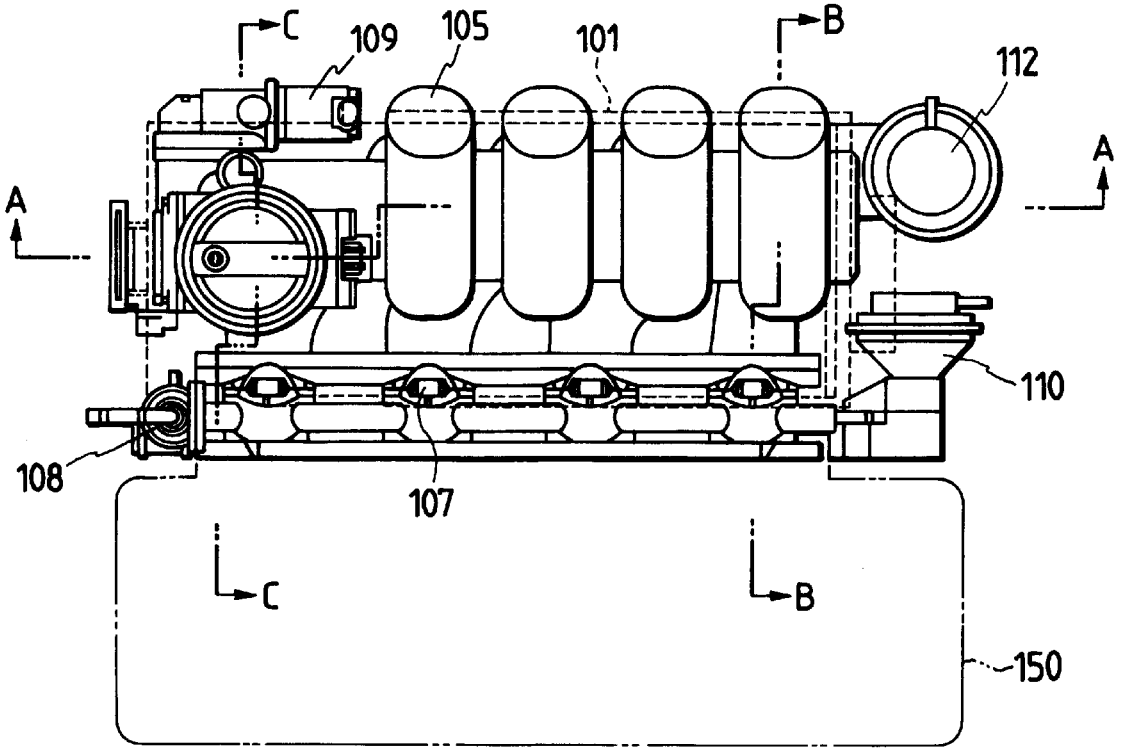
FIG. 31 is a top plane view of another structural embodiment of air intake arrangements according to the present invention which is realized based on one of the embodiments illustrated by the schematic fluidic system diagrams in FIG. 1, FIG. 11, FIG. 12, FIG. 13, FIG. 15, FIG. 16(a) and FIG. 17.
Figure 32:
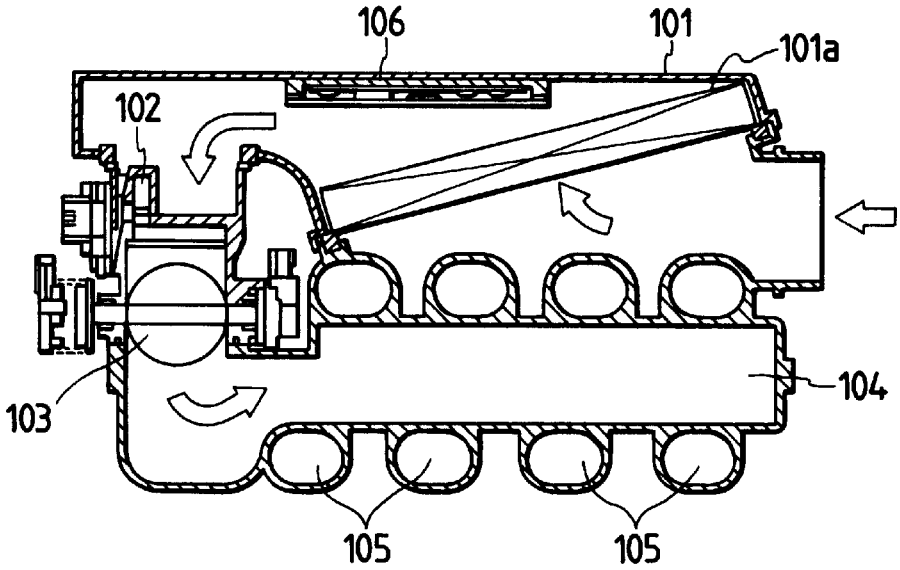
FIG. 32 is a cross sectional view taken along the line A—A in FIG. 27.
Figure 33:
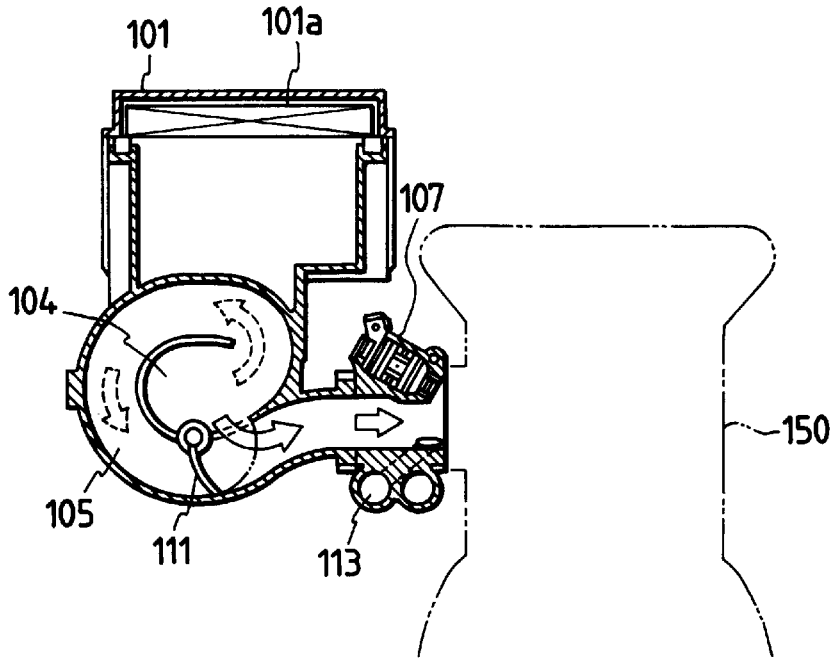
FIG. 33 is a cross sectional view taken along the line B—B in FIG. 27.
Figure 34:
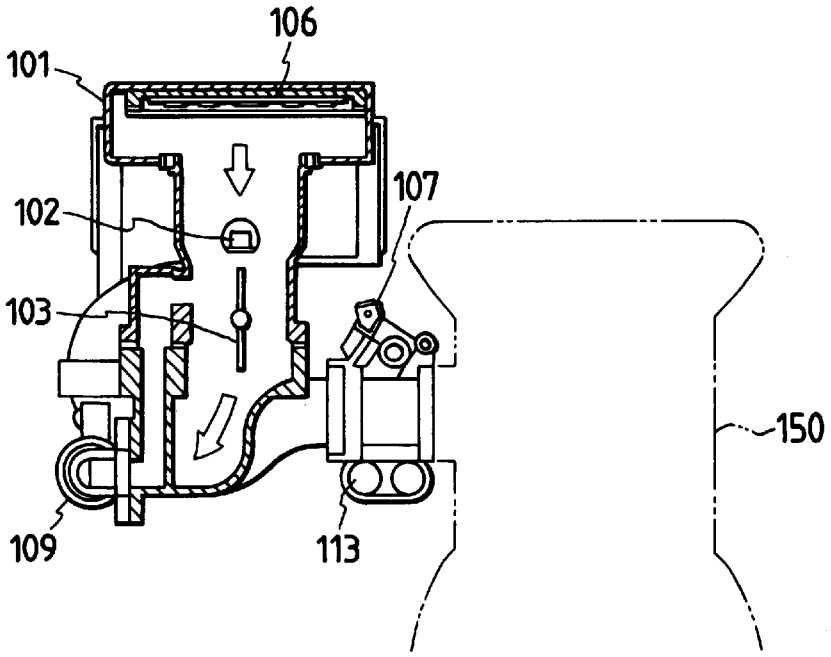
FIG. 34 is a cross sectional view taken along the line C—C in FIG. 27.

FIG. 27 is an upper view illustrating one structural embodiment of the present invention. FIG. 28 is a cross sectional view taken along the line A—A of FIG. 27, FIG. 29 is another cross sectional view taken along the line B—B of FIG. 27 and FIG. 30 is a further cross sectional view taken along the line C—C in FIG. 27. In these drawings, numeral 101 is an air cleaner, 102 a measuring portion of inlet air flow rate, 103 a throttle valve, 104 a surge tank or a main collector chamber, 105 independent [braching] *branching* air intake conduits, 106 a control unit, 107 fuel injectors, 108 a pressure regulator, 109 an auxiliary air control valve, 110 an EGR valve, 111 a conduit length variable type intake air valve (wherein the valve opened position is illustrated by the solid line and the valve closed position by the broken line), 112 an actuator for opening and closing the conduit length variable type intake air valve, 113 an auxiliary air intake passage, and 150 an engine main body. Further, the arrows in the drawings indicate the flow direction of the inlet air in the arrangement, and the arrows indicated by broken lines indicate the inlet air flow direction when the conduit length variable type intake air valve 111 is closed. The air to be taken-in into the engine is introduced into the air cleaner 101 via the inlet port thereof and is filtered via an air filter 101*a* provided therein and is led via the air flow rate measuring portion 102 toward the throttle valve 103 which is operated to open or close in accordance with intentions of the motor vehicle driver. An inlet air flow is controlled by an opening area determined by the throttle valve 103. The air passing through the throttle valve 103 is distributed from the surge tank 104 to the respective engine cylinders via the independent branching intake air conduits 105. In the respective independent branching intake air conduits 105, the conduit length variable type intake air valve 111 is provided of which opening and closing operations are controlled by the actuator 112. Other than via the above air passage, the inlet air which bypasses the throttle valve 103 at the downstream of the air flow rate measuring portion 102 is further supplied to the engine via the auxiliary intake air passage 113 after the inlet air amount is controlled by the auxiliary air control valve 109.

The fuel to be supplied to the engine of which pressure in the fuel piping is maintained constant by the pressure regulator 108, is injected into the respective engine cylinders from the fuel injectors 107 which are actuated based on a signal value calculated in the control unit 106 by making use of signals such as from the air measuring portion 102.

In the present embodiment, the elements indicated above as well as the EGR valve 112 for supplying a part of the exhaust gas to the engine are structured into an integral body. Some of the elements can be removed from the integral body and additional elements can be added thereto if required, the elements integrated into the integral body are not limited to those indicated above.

With the above structure, a duct connecting the air cleaner or the intake air flow meter accommodating portion with the throttle valve accommodating portion provided in a conventional air intake arrangement is eliminated, and the air cleaner and the air flow meter accommodating portion can be mounted on the engine portion. Further, in the present embodiment, since the throttle valve 103 is located between the independent branching intake air conduits 105, the volume of the surge tank 104 can be increased, while keeping the length of the independent branching intake air conduits 105 for multi-cylinders substantially identical each other in the limited space. Accordingly, the space for the air intake arrangement can be reduced as well as the entirety of the air intake arrangement can be treated as a unitary body, thereby the lay-out design thereof in an engine room of a motor vehicle is facilitated and a standardization thereof is enabled. Further, the number of steps for the assembly work thereof is reduced, and an engine performance test on the respective actual products in an engine production line is enabled. Still further, since the air intake arrangement itself is formed into an integral body, a performance test on the respective actual products is enabled, thereby the performance of the entire air intake arrangement can be controlled at the moment of their productions. Still further, as a general tendency, the output signal of the air flow meter is likely to oscillate due to engine intake air ripple and the oscillation is maximized when the engine rpm coincides with the natural oscillation frequency in the air intake conduit. Since the length of the conduit portion wherein the air flow meter is disposed substantially corresponds to the length from the air cleaner to the surge tank, in the conventional arrangement wherein the conduit length was extended because of the provision of the duct, the natural oscillation frequency of the conduit showed a frequency in a low frequency range which likely caused a disturbance in the air flow meter output signal during actual use thereof, however, in the present embodiment, the conduit length is shortened thereby the natural oscillation frequency in the conduit is improved to show a frequency in a high frequency range (five times higher frequency than that of the conventional arrangement, for example, from 25 Hz to 125 Hz) and the conventional disturbance caused in the air flow meter output signal is reduced.

Further, a torque increase during a low engine rpm is effected by elongating the length of the respective independent branching intake air conduits. In the present embodiment, the elongation of the respective independent branching air intake conduits is realized in a limited space by disposing the respective independent branching air intake conduits 105 around the circumference of the surge tank 104 and by commonly using a part of the outer wall face of the surge tank 104. Contrary, a torque increase during a high engine rpm is effected by shortening the length of the respective independent branching intake air conduits which is a totally opposite requirement for that during a low engine rpm. In the present embodiment, independent branching air intake conduits resolving the above opposing requirements are easily realized by incorporating the conduit length variable type intake air valve 111 as illustrated clearly in FIG. 29. In the present embodiment, the conduit length variable type intake air valve 111 is controlled to open the valve during a high engine rpm and to close the valve during a low engine rpm by a diaphragm mechanism of the actuator 112. However, the control method of the valve is not specifically limited to that explained above, the valve, for example, can be controlled linearly by making use of an electric motor.

Further, the control unit 106 which controls engine operating conditions is mounted on the outer wall of the air cleaner 101. Accordingly, the control unit 106 is cooled by the inlet air and a thermal effect thereon from the engine 150 is reduced. Further, the replacement work of the control unit 106 in service stations is facilitated and the serviceability of the motor vehicle is further improved.

Still further, the auxiliary air intake passage 113 accommodating the auxiliary air control valve 109 is also integrated in the air intake arrangement of the present embodiment, piping lines such as by rubber hoses are eliminated and the production cost of the arrangement is reduced.

Still further, although the above air intake arrangement can be constituted by combining respective separately manufactured functional elements, [however when these functional elements] *preferably* as many as possible are manufactured by one-piece molding such as with a synthetic resin, *so that* the manufacturing cost thereof is further reduced.

FIG. 31 through FIG. 34 show another structural embodiment. These figures correspond respectively to FIG. 27 through FIG. 30 of the previous structural embodiment and the same reference numerals are used as in the previous structural embodiment for designating the same or equivalent elements.

In the present embodiment, the throttle valve 103 is located outside the respective independent branching air intake conduits 105. With this structure, the volume of the air filter 101*a* is increased and the resistance for the intake air flow is decreased, thereby the engine output can be raised. Further, the one-piece molding of the respective functional elements is further facilitated.

Further, the control unit 106 is mounted on the inside of the air cleaner 101. With this structure, the control unit 106 is further forcedly cooled by the inlet air, moreover since the control unit 106 is located downstream *of* the air filter 101*a* the control unit 106 is hardly subjected to such as water splashes and dusts, thereby the reliability of the control unit 106 is further enhanced. Further the replacement work of the control unit in the service station is made [more] easier like that for the air filter 101*a*. Further, in the above two structural embodiments, when the air intake arrangement is combined with the engine after completing the same as one subassembly unit, the efficiency of the assemblying work is further improved.

Through the provision of the auxiliary gas passage through which a plurality of gases are introduced other than the main passage of the air intake conduit and of the outlet port thereof near the air intake valve, the direction of the auxiliary gas passage with respect to the main air intake passage can be freely set, and the amount of auxiliary gas can be controlled by the control valve even during the engine operation, thereby the strength of the induced gas swirl can be freely varied in a wide range in comparison with the conventional arrangement.

Since the gas swirl inducing means of the present invention requires [such as] no intake air control valve and helical port provided in the main air passage as required in the conventional arrangement, namely, elements constituting a resistance to the intake air flow in the main air passage during the engine full load operation are eliminated, a reduction of engine output is suppressed.

Since the inner volume of the auxiliary gas passage is determined smaller than that of the main air passage, a required amount of gas can be supplied promptly to the engine, thereby an engine stability during an idling operation is enhanced and a response characteristic during an idling operation, a torque-up operation and an EGR operation is improved.

Since the EGR gas can be introduced uniformly into the respective engine cylinders or can be introduced in the direction so as not to adversely affect the combustion therein, the engine can operates stably under an EGR operation with a large amount of EGR gas.

Since the mounting portion, the fuel piping and the air piping for fuel atomization for the fuel injection valve are integrally formed with the air intake conduit, the fuel injection valve can be located near the central axis of the air intake conduit, and the angle formed by the axis of atomized fuel and the central axis of the air intake conduit can be reduced. Further, the air intake conduit can be designed optimally in accordance with the spreading configuration of the atomized fuel so as to reduce the deposition rate on the inner wall of the air intake conduit of the atomized fuel injected from the fuel injection valve. As a result, fuel deposition on the air intake conduit is reduced and the air intake arrangement having a good acceleration response characteristic of fuel is obtained.

We claim:

1. An air intake arrangement for an internal combustion engine comprising:

a main air intake conduit leading to a gas intake valve [(241, 306)] for respective engine cylinders [(206, 244, 307, 150)] and including a main air intake passage [(202)], a main collector [(204, 104, 304, 319)] chamber and independent branching air intake passages [(205, 305, 105)] for the respective engine cylinders [(206, 244, 307, 150)] connected in series;

a throttle valve [(203, 314, 103)] disposed in the main intake air passage [(202)] for controlling the flow rate of air passing therethrough an auxiliary air intake passage [(210, 308, 113)] bypassing said main air intake conduit, *wherein* an inlet port of said auxiliary air intake passage [(210, 308, 113)] opens into the main air intake passage [(202)] at the upstream of said throttle valve [(203, 314, 103)], *and* an outlet port [(213)] of said auxiliary air intake passage [(210, 308, 113)] opens into the respective independent branching air intake passages [(205, 305, 105)] near the gas intake valve [(241, 306)] for the respective engine cylinders [(206, 244, 307, 150)] in such a manner that gas blown-out from said auxiliary air intake passage [(210, 308, 113)] induces a gas swirl in the respective engine cylinders [(206, 244, 307, 150)];

an intake air control valve [(211, 313, 109)] disposed in said auxiliary air intake passage [(210, 308, 113)] for controlling the flow rate of air passing therethrough;

an EGR gas passage [(214)] merged into said auxiliary air intake passage [(210)] at the downstream of said intake air control valve [(211)];

an EGR gas control valve [(212)] disposed in said EGR gas passage [(214)] for controlling the flow rate of EGR gas passing therethrough; and a control unit [(222)] which [determined] *determines* an operating condition of the internal combustion engine and controls opening degrees of said intake air control valve [(211)] and said EGR gas control valve [(212)] based on the determined engine operating condition.

2. An air intake arrangement for an internal combustion engine according to claim 1, wherein said auxiliary air intake passage [(210)] is constituted by a first auxiliary air intake passage bypassing said throttle valve [(203)], and a second auxiliary air intake passage [(210)] bypassing said main air intake conduit in such a manner that an inlet port of said second auxiliary air intake passage [(210)] opens into the main air intake passage [at the] downstream of said throttle valve [(203)] and an outlet port of said auxiliary air intake passage [(210)] opens into the respective independent branching air intake passages [(205)] near the gas intake valve [(241)] for the respective engine cylinders [(206, 244)] and further comprises a further throttle valve [(251)] disposed in the main air intake passage [at the] downstream of the inlet port of said second auxiliary air intake passage [(210)] for controlling flow rate of air passing through both said main air intake conduit and said auxiliary air intake passage [(210) (FIG. 11)].

3. An air intake arrangement for an internal combustion engine according to claim 1, wherein said auxiliary air intake passage [(210)] further comprises a throttle nozzle [(254)] at the outlet port [(213)] of said auxiliary air intake passage [(210)] for further controlling the flow rate of gas passing therethrough [(FIG. 13)].

4. An air intake arrangement for an internal combustion engine according to claim 1, wherein said auxiliary air intake passage [(308)] further comprises an auxiliary collector cheer [(318)] disposed downstream said intake air control valve [(313) (FIG. 17)].

5. An air intake arrangement for an internal combustion engine according to claim 1, wherein the outlet port [(213)] of said auxiliary gas intake passage [(210)] is positioned eccentrically with respect to said respective independent branching air intake passages [(205) (FIG. 7 through FIG. 10)].

6. An air intake arrangement for an internal combustion engine according to claim 1, wherein said auxiliary gas intake passage [(210)] is provided with a plurality of outlet ports [(213)] for said respective independent branching air intake passages [(205) (FIG. 10)].

7. An air intake arrangement for an internal combustion engine according to claim 1, wherein said auxiliary air intake passage [(210, 308)] further comprises a further auxiliary air intake passage bypassing said intake air control valve and a further intake air control valve disposed in said further auxiliary air intake passage [(FIG. 12, FIG. 16(a))].

8. An air intake arrangement for an internal combustion engine according to claim 3, wherein both said throttle valve [(314)] and said intake air control valve [(313)] are mechanically coupled to an acceleration pedal and are controlled in synchronism with a predetermined time lag [(FIG. 16(a) FIG. 16(b))].

9. An air intake arrangement for an internal combustion engine according to claim 1, wherein an inner volume of said auxiliary gas intake passage [(210, 308)] is determined smaller than that of said main air intake conduit.

10. An air intake arrangement for an internal combustion engine according to claim 9, wherein an inner volume of said auxiliary gas intake passage [(210, 308)] is determined less than 80% of that of said main air intake conduit.

11. An air intake arrangement for an internal combustion engine according to claim 1, wherein said main air intake passage, said main collector chamber [(104)], *and* said independent branching air intake passages [(105)] which constitute said main air intake conduit[, and said auxiliary gas intake passage (113) are formed integrally (FIG. 27 through FIG. 34)].

12. An air intake arrangement for an internal combustion engine according to claim 11, wherein said respective independent branching air intake passages [(105)] are disposed around said main collector chamber [(104)] using a part of the wall thereof in common and includes a conduit length varying valve [(111)] which switches between two inlet ports provided for said respective independent branching air intake passages [(105) (FIG. 27 through FIG. 34)].

13. An air intake arrangement for an internal combustion engine according to claim 12, wherein said main air intake passage accommodating said throttle valve [(103)] *is* disposed at the center of said main collector chamber [(104)] with respect to the longitudinal direction thereof [(FIG. 27 through FIG. 30)].

14. An air intake arrangement for an internal combustion engine according to claim 12, wherein said main air intake passage accommodating said throttle valve [(103)] *is* disposed at one end of said main collector chamber [(104)] with respect to the longitudinal direction thereof [(FIG. 31 through FIG. 34)].

15. An air intake arrangement for an internal combustion engine according to claim 1, wherein a fuel injection valve receiving arrangement [(262)], a fuel supply piping [(263)] for a fuel injection valve [(261)] and an air supply piping [(264)] for fuel atomization are integrally formed on the outer circumference of said respective independent branching air intake passages [(205) at the ] downstream thereof [(FIG. 14)].

16. An air intake arrangement for an internal combustion engine according to claim 15, wherein a direction of the outlet port of said auxiliary gas intake passage [(210)] *is* determined in such a manner that the blown-out gas from the outlet port [(213)] is introduced into said respective independent branching air passages [(205)] so as not *to* directly mix with fuel injected from the fuel injection valve [(245) (FIG. 10)].

17. An air intake arrangement for an internal combustion engine according to claim 15 further comprising:

an assist air passage [(310)] connecting said main air intake passage at the upstream of said throttle valve [(303)] to the air supply piping [(264)] for fuel atomization [(FIG. 15, FIG. 16 (a), FIG. 17)].

18. An air intake arrangement for an internal combustion engine according to claim 17, wherein said assist air passage [(310)] branches from said auxiliary gas intake passage [(313)] to the air supply piping [(264)] for fuel injection [(FIG. 15)].

19. An air intake arrangement for an internal combustion engine according to claim 1, wherein when said control unit [(222)] determines one of engine operating conditions for an idle speed control, a fast idle control, a torque-up control and a fuel lean air/fuel ratio control, said control unit [(222)] controls to open said intake air control valve [(211, 313)] so as to supply air to the respective engine cylinders [(206, 244, 307)] through said auxiliary gas intake passage [(210, 308)].

20. An air intake arrangement for an internal combustion engine according to claim 19, wherein when said control unit [(222)] determines a change in engine operating condition from a region suitable for operating at a stoichiometric air/fuel ratio to a region suitable for operating at a fuel lean air/fuel ratio, said control unit [(222)] controls to hold an amount of fuel to be injected to a previous amount, then to open said intake air control valve [(211, 313)] based on an engine operating condition and thereafter to cancel the fuel amount holding [(FIG. 18(a), FIG. 18(b), FIG. 19a)].

21. An air intake arrangement for an internal combustion engine according to claim 19, wherein when said control unit [(222)] determines that the engine operating condition stays in a region suitable for operating at a fuel lean air/fuel ratio, said control unit [(222)] compares an actual air/fuel ratio with a target air/fuel ratio and controls amount of fuel to be injected based on the comparison result [(FIG. 19(b))].

22. An air intake arrangement for an internal combustion engine according to claim 19, wherein when said control unit [(222)] determines that the engine operating condition stays in a region suitable for operating at a fuel lean air/fuel ratio, said control unit [(222)] compares an actual air/fuel ratio with a target air/fuel ratio and controls the opening degree of said intake air control valve [(211, 313)] based on the comparison result [(FIG. 20)].

23. An air intake arrangement for an internal combustion according to claim 19, wherein when said control unit [(222)] determines a change in engine operating condition within a region suitable for operating at a fuel lean air/fuel ratio, said control unit [(222)] controls the opening degree of said intake air control valve [(211, 313)] based on an engine operating condition [(FIG. 23(a), FIG. 23(b), FIG. 24)].

24. An air intake arrangement for an internal combustion engine according to claim 19, wherein when said control unit [(222)] determines a change in engine operating condition from a region suitable for operating at a fuel lean air/fuel ratio to a region suitable for operating at a stoichiometric air/fuel ratio, said control unit [(222)] controls to hold an amount of fuel to be injected to a previous amount, then to close said intake air control valve [(211, 313)] and thereafter to cancel the fuel amount holding [(FIG. 25(a), FIG. 25(b), FIG. 26)].

25. An air intake arrangement for an internal combustion engine according to claim 19, wherein when said control unit [(222)] determines that the engine operating condition stays in a region suitable for operating at a fuel lean air/fuel ratio, said control unit [(222)] compares an actual engine roughness with a target engine roughness and controls the opening degree of said intake air control valve [(211, 313)] based on the comparison result [(FIG. 21)].

26. An air intake arrangement for an internal combustion engine according to claim 25, wherein when said control unit [(222)] determines that the engine operating condition stays in a region suitable for operating at a fuel lean air/fuel ratio, said control unit [(222)] compares an actual engine roughness with a target engine roughness, and when the actual engine roughness is determined below the target engine roughness, said control unit [(222)] controls to increases an opening degree of said intake air control valve [(211, 313)] and repeats the comparison until the actual engine roughness exceeds the target engine roughness, and when said control unit [(222)] determines that the actual engine roughness exceeds the target engine roughness, the control unit [(222)] controls to decrease an opening degree of said intake air control valve [(211), 313)] and to rewrite the previous opening degree for the instant opening degree for the subsequent use [(FIG. 22)].

*27. An intake air system for a multi-cylinder internal combustion engine, comprising:*

*a surge tank having air outlets corresponding to respective cylinders of the engine,*

*an air cleaner chamber disposed upstream of the surge tank,*

*an air flow meter operatively arranged for measuring air flow between the air cleaner chamber and the surge tank,*

*and a throttle valve disposed between the air cleaner chamber and the surge tank for controlling air flow from the air cleaner chamber to the surge tank, and operatively supported by an integrally formed tubular part extending from the air cleaner chamber to the surge tank.*

*28. An intake air system according to claim 27, wherein fuel injectors are operatively arranged with respect to the air outlets in a housing.*

*29. An intake air system according to claim 27, wherein the air flow meter is operatively supported by the tubular part.*

*30. An intake air system according to claim 27, wherein the air flow meter is disposed in the tubular part.*

*31. An intake air system according to claim 27, wherein independent branching air intake conduits are operatively arranged at a peripheral region of the surge tank.*

*32. An intake air system according to claim 27, wherein said tubular part is a resin molded part.*

*33. An intake air system according to claim 32, wherein the air flow meter is operatively supported by the tubular part.*

*34. An intake air system according to claim 32, wherein the air flow meter is disposed in the tubular part.*

*35. An intake air system according to claim 32, wherein said housing contains an auxiliary air passage.*

*36. An intake air system for a multi-cylinder/multi-point injection internal combustion engine, comprising:*

*a surge tank having air outlets for respective cylinders of the engine, which outlets are adjacent one another in a longitudinal direction of the surge tank,*

*an air cleaner chamber disposed upstream of the surge tank,*

*and a throttle valve operatively arranged between the air cleaner chamber and the surge tank, and disposed between a central portion of a pair of the air outlets.*

*37. An intake air system for a multi-cylinder/multi-point injection internal combustion engine, comprising:*

*a surge tank having air outlets corresponding to respective cylinders of the engine,*

*independent branching air conduits operatively arranged at a peripheral region of the surge tank and each having a respective passage at a mid-portion thereof for communicating with the surge tank, and*

*valve structure operatively arranged selectively to open and close the passages.*

*38. An intake air system for a multi-cylinder/multi-point injection internal combustion engine, comprising:*

*an air cleaner assembly, and*

*a control unit operatively associated with a wall of the air cleaner assembly for controlling engine operating conditions.*

*39. An intake air system according to claim 38, wherein said control unit is mounted on an inside of said air cleaner assembly.*

*40. An air intake system for a fuel injected engine, comprising:*

*a resin molded air intake structure body having an air intake port for taking in air which has passed through an air cleaner upstream thereof,*

*air leading-through ports for respective cylinders of the engine, which ports are operatively associated with the air intake port,*

*a throttle valve installed at the air intake port for controlling an air intake amount, and*

*fuel injectors provided on an associated one of the air leading-through ports for supplying fuel to the cylinders.*

*41. An air intake system according to claim 40, wherein an air flow meter for detecting an amount of the air from the air intake port toward the cylinders is operatively arranged at an inlet portion of the air intake structure body.*

*42. An intake air system for a multi-cylinder internal combustion engine, comprising:*

*air intake structure body having an air intake passage, a surge tank, a common wall separating the air intake passage and the surge tank, and an air cleaner operatively arranged in the air intake passage.*

*43. An air intake system according to claim 42, wherein the air intake structure body is a one-piece resin molded body.*

*44. An air intake system according to claim 43, wherein means for supplying fuel to each fuel injector is integrally formed in the air outlets.*

*45. An intake air apparatus for a fuel injected engine, comprising:*

*a surge tank having air outlets for respective engine cylinders, and*

*a fuel injector for the respective engine cylinders being arranged at the air outlets between the outlets and the engine cylinders,*

*wherein the air outlets have a separate metal chamber, and wherein the fuel injector is mounted on the separate metal member.*

*46. An air intake body arranged laterally of an engine block, comprising:*

*a surge tank positioned parallel to a longitudinal direction of the engine block, and a throttle valve operative to control an amount of air which is introduced into the surge tank and arranged such that a flow direction of the air passing through the throttle valve is at a substantially right angle to a flow direction of air in the surge tank.*

*47. An air intake body according to claim 46, wherein the air flow direction through the throttle valve is substantially vertical.*

*48. An air intake body according to claim 46, wherein the throttle valve is located centrally of the surge tank as viewed in a longitudinal direction thereof.*

*49. An air intake body according to claim 46, wherein the throttle valve is arranged above the surge tank and no higher than the top of the engine block.*

*50. An air intake body according to claim 49, wherein the throttle valve is arranged laterally of the surge tank such that the throttle valve and surge tank have substantially the same longitudinal dimension as the engine block.*

*51. An air intake body according to claim 50, wherein the throttle valve is arranged no higher than the top of the engine block.*

*52. An air intake system for an engine, comprising an air cleaner for cleaning air supplied to each engine cylinder, a throttle valve, a surge tank, and independent air intake conduits operatively associated with the surge tank, wherein an air passage is partitioned from the surge tank, the air cleaner is installed in the air passage above the surge tank, and the throttle valve is operatively arranged between the air passage and an inlet port of said surge tank.*

*53. An air intake system for an engine, comprising a first air passage,*

*a throttle valve arranged in the first air passage,*

*second and third air passages respectively upstream and downstream of the throttle valve and each having a cross-section area larger than the first air passage,*

*an air cleaner installed within the second air passage upstream of the throttle valve, and*

*a plurality of independent air intake conduits connected to each cylinder of the engine operatively communicating with the third passage downstream of the throttle valve, wherein,*

*the second and third air passages share a common wall.*

*54. An air intake system for an engine, comprising:*

*a first air passage portion in which a throttle valve is operatively arranged,*

*a second air passage portion for deflecting an air flow from said throttle valve at substantially a right angle,*

*a surge tank for receiving the deflected air flow,*

*a plurality of independent branching air intake conduits for swirling air around a periphery of the surge tank and for distributing the air from the surge tank into a respective cylinder of the engine,*

*wherein the first air passage portion is a first unitary mold material body, and*

*the second air passage portion, the surge tank and the plurality of independent branching air intake conduits is a second mold material body.*

*55. An air intake system according to claim 54, wherein the molded material bodies are comprised of resin.*

*56. An air intake system for an engine, comprising a throttle valve, a surge tank arranged relative to said throttle valve such that a controllable air flow from said throttle valve is introduced therein and is supplied to each cylinder*

*of the engine through a plurality of respective independent branching air intake conduits, and an auxiliary air intake passage opening in a portion joining the independent branching air intake conduit and the respective cylinder and supplying air to the respective cylinder by bypassing the associated independent branching air intake conduit, wherein the auxiliary air intake passage has a diameter smaller than a diameter of the independent branching air intake conduit and the auxiliary air intake passage is formed at a vicinity of an installing portion of a fuel injector.*

*57. An air intake system according to claim 56, wherein an upstream end of the auxiliary air intake passage opens upstream of said throttle valve.*

*58. An air intake system according to claim 56, wherein two auxiliary air intake passages are provided on the system and the two auxiliary air intake passages are formed by sandwiching a fuel injector.*

*59. An intake air apparatus for an engine, comprising:*

*a passage for introducing an air flow passed through a throttle valve into a surge tank by deflecting the air flow into the surge tank at substantially a right angle to the air flow through the throttle valve,*

*plural independent branching air intake conduits from said surge tank to each of which the air flow is conducted by substantially a right angle deflection, and in which the air flow is swirled with a predetermined angle, before the air flow is introduced into each of cylinders.*

*60. An air intake system in which an air flow amount is increased in response to actuation of an acceleration pedal, comprising:*

*a main air intake passage, and*

*an auxiliary air intake passage having a diameter smaller than a diameter of said main air intake passage,*

*wherein with an increase in the actuation amount of said acceleration pedal, the air flow amount from said main air intake passage is gradually increased up to a predetermined actuation amount of said acceleration pedal, an air flow is introduced from said auxiliary air intake passage, while maintaining a constant air flow rate from said main air intake passage.*

*61. An air intake apparatus comprising:*

*an air intake passage portion having an air cleaner provided therein;*

*a surge tank; and*

*an air intake passage body having a throttle valve and being operatively connected between said air cleaner case and said surge tank,*

*wherein said air cleaner case, said surge tank, and said air intake passage body are integrally formed as a body.*

*62. An air intake apparatus according to claim 61, wherein said throttle valve is projectingly disposed in said surge tank.*

*63. An air intake apparatus according to claim 62, wherein said throttle valve is projectingly disposed in a central portion of said surge tank and at an intermediate portion of plural independent branching air intake conduits associated with said surge tank.*

*64. An air intake apparatus, comprising:*

*an air intake passage portion having an air cleaner provided therein;*

*a surge tank;*

*plural independent branching air intake conduits opening into said surge tank;*

*a communication passage portion for connecting said air intake passage portion and said surge tank, and*

*a throttle valve installed in said communication passage portion.*

*65. In an air intake passage body having a portion for introducing an air flow therethrough and having a U-shaped form,*

*an air cleaner is installed at an uppermost upstream portion of said portion;*

*a throttle valve is operatively positioned on a bend portion of said portion;*

*a surge tank being formed at a most downstream end of said portion;*

*wherein plural independent branching air intake conduits are connected to said surge tank.*

*66. An air intake passage body according to claim 65, wherein said plural independent branching air intake conduits are formed in a shape for swirling around a periphery of said surge tank.*

*67. An air intake passage body according to claim 65, wherein said air cleaner is obliquely arranged with respect to an air flow.*

*68. An air intake passage body according to claim 65, wherein said plural independent branching air intake conduits are arranged between a wall face of an air cleaner case of said air intake passage body and a wall face of said surge tank.*

*69. An air intake passage body according to claim 68, wherein said wall face of said surge tank is an outer wall face of said plural independent branching air intake conduits.*

*70. An air intake passage body according to claim 68, wherein an outer wall face of said independent branching air intake conduits is commonly shared by at least one of said wall face of said air cleaner case and said wall face of said surge tank.*

*71. An air intake system, comprising an engine control unit, and an air cleaner arranged relatively to the engine control unit for cleaning a cooling air for the unit.*

*72. An air intake apparatus, comprising an air cleaner receiving portion, and an engine control unit having a part thereof installed at a wall face of said air cleaner receiving portion to enable heat generated by the unit to be discharged toward an air flow.*

*73. An air intake apparatus according to claim 72, wherein said air cleaner receiving portion is a resin molded member.*

*74. An air intake arrangement for an internal combustion engine, comprising:*

*a main air intake conduit leading to a gas intake valve for respective engine cylinders and including a main air intake passage, a surge tank and independent branching air intake passages for said respective engine cylinders connected in series;*

*a throttle valve disposed in said main air intake passage for controlling the flow rate of air passing therethrough;*

*an auxiliary air intake passage bypassing said main air conduit, an inlet port of said auxiliary air intake passage opening into said main air intake passage, an outlet port of said auxiliary air intake passage opening into said respective independent branching air intake passage proximate the gas intake valve for said respective engine cylinders so that a gas blown-out from said auxiliary air intake passage induces a swirl in said respective engine cylinders;*

*a fuel injector for controlling a supply fuel amount to said respective engine cylinders in response to an engine operating condition; and*

*a control unit for controlling an auxiliary air flow rate and fuel supply from said fuel injector;*

*wherein an engine operating condition transfers to a predetermined set different air/fuel inspection amount and controls air/fuel ratio by controlling the auxiliary air flow rate, and, after that, said control unit sets a predetermined fuel injection amount.*

*75. An air intake arrangement according to claim 74, wherein, after the transfer of the engine operating condition, said control unit adjusts the fuel injection amount to control the air/fuel ratio.*

*76. An air intake arrangement according to claim 74, wherein the air amount is determined in accordance with a result of a comparison of an air/fuel ratio before the transfer of the engine operating condition and an air/fuel ratio after the transfer of the engine operating condition.*

*77. An air intake arrangement according to claim 74, wherein when said control unit determines at least one selected from engine operating conditions for an idle speed control, a fast idle control, a torque-up control and a fuel lean air/fuel ratio control, and said control unit controls air supply air to said respective engine cylinders through said auxiliary air intake passage.*

*78. An air intake arrangement according to claim 74, wherein when said control unit determines that the engine operating condition remains in a region suitable for fuel lean air/fuel ratio operation, and said control unit compares an actual engine roughness with a target engine roughness and controls the flow rate of the auxiliary air based on the comparison.*

*79. An air intake arrangement for an internal combustion engine, comprising:*

*a main air intake conduit leading to a gas intake valve for respective engine cylinders and including a main air intake passage, a surge tank and independent branching air intake passages for said respective engine cylinders connected in series;*

*a throttle valve disposed in said main air intake passage for controlling flow rate of air passing therethrough;*

*an auxiliary air intake passage bypassing said main air intake conduit, an inlet port of said auxiliary air intake passage opening into said main air intake passage, an outlet port of said auxiliary air intake passage opening into said respective independent branching air intake passages proximate the gas intake valve for said respective engine cylinders so that a gas blown-out from said auxiliary air intake passage induces a swirl in said respective engine cylinders;*

*a swirl control device for controlling a swirl condition; and*

*a control unit for controlling an auxiliary air flow rate and fuel supply from a fuel injector,*

*wherein said control unit controls the swirl by controlling said swirl control device in response to an engine operational condition and said swirl control device controls at least one of an air flow supplied from said auxiliary air intake passage and an air inflow direction into said respective engine cylinders.*

*80. An air intake arrangement for an internal combustion engine according to claim 79, wherein*

*said control unit controls said swirl control device to generate a swirl in said respective engine cylinders at a low speed engine operational region and to not generate a swirl in said respective engine cylinders at a high speed engine operational region.*

*81. An air intake arrangement according to claim 79, wherein said control unit is configured to determine at least one selected from engine operating conditions for an idle speed control, a fast idle control, a torque-up control and a fuel lean air/fuel ratio control and to control said swirl control device so as to supply air to said respective engine cylinders through said auxiliary air intake passage.*

*82. An air intake arrangement according to claim 79, wherein said control unit is configured to determined that the engine operating condition remains in a region suitable for fuel lean air/fuel ratio operation and to compare an actual engine roughness with a target engine roughness to control said swirl control device based on the comparison.*

*83. An air intake arrangement according to claim 79, wherein a flow of the gas from said auxiliary air intake passage enters inside two air intake ports.*

*84. An air intake arrangement according to claim 74, wherein a flow of the gas from said auxiliary air intake passage enters a central portion of said cylinder.*

*85. An air intake arrangement according to claim 84, wherein the flows of the gas are two and the two gas flows are formed by sandwiching the fuel injector.*

*86. An air intake arrangement according to claim 84, wherein an air passage is provided upstream of a valve for controlling an air flow rate of the main air intake conduit, thereby the gas flow of the main air intake conduit is controlled.*

*87. In an air intake arrangement for an internal combustion engine comprising:*

*a main intake conduit leading to a gas intake valve for each of respective engine cylinders and including a main intake passage, a main collector chamber and independent branching air intake passage for the respective engine cylinders connected in series;*

*a throttle valve disposed in said main intake passage for controlling a flow rate of air passing therethrough;*

*an auxiliary air intake passage bypassing said main air intake conduit, wherein an inlet port of said auxiliary air intake passage opens into said main air intake passage upstream of a valve for controlling the air flow rate of said main air intake conduit, and an outlet port of said auxiliary air intake passage opens into said respective independent branching air intake passages near said gas intake valve for the respective engine cylinders in such a manner that gas blown-out from said auxiliary air intake passage induces a gas swirl at the respective engine cylinders;*

*an intake air control valve disposed in said auxiliary air intake passage for controlling the flow rate of air passing therethrough;*

*an EGR gas passage merged into said auxiliary air intake passage downstream of said intake air control valve and an EGR gas control valve disposed in said EGR gas passage for controlling the flow rate of EGR gas passing therethrough; and*

*a control unit which determines an operating condition of the internal combustion engine and controls opening degrees of said intake air control valve and said EGR gas control valve,*

*wherein, when said control unit determines at least an engine operating condition for a fuel lean air/fuel ratio control, said control unit controls opening degree of said intake control valve so as to vary air supply to the respective engine cylinders through said auxiliary air intake passage.*

*88. An intake air device for an internal combustion engine of an electronic fuel injection type, wherein an air cleaner is integrated in a unit with a plurality of independent branching intake air conduits which are, in turn, integrated with an outer portion of a collector, said air cleaner being integrated within the boundaries of a longitudinal direction length of said unit, wherein the longitudinal direction of the unit is parallel to a longitudinal direction of the collector and a longitudinal direction of a main body of the engine, and further wherein the length of said unit in the longitudinal direction of the unit is not larger than the length of the main body of the engine in the longitudinal direction of the main body of the engine.*

*89. An intake air device for an internal combustion engine of an electronic fuel injection type according to claim 88, wherein said air cleaner is arranged so that the center of said air cleaner is positioned at the center of said unit.*

*90. An intake air device for an internal combustion engine, wherein a unit is formed by integrating into a one-piece structure a plurality of independent symmetrically arranged branching intake air conduits, an air cleaner chamber having an air cleaner therein integrated with said branching intake air conduits and positioned in said unit in opposing relationship to the branching intake air conduits, and a throttle valve located to receive air from said air cleaner chamber and to introduce the air to said branching intake air conduits, wherein said throttle valve controls the flow of said air between the air cleaner chamber and the branching intake air conduits.*

*91. An intake air device according to claim 90, wherein the unit is formed as a one-piece structure.*

*92. An intake air device for an internal combustion engine comprising a one-piece integrated structure including a plurality of independent branching intake air conduits and an air cleaner chamber having an air cleaner therein integrated with said branching intake air conduits, wherein said independent branching intake air conduits and said air cleaner chamber are formed of a molded body.*

*93. An intake air device according to claim 92, wherein the independent branching intake air conduits and the air cleaner chamber are formed as a one-piece structure.*

*94. An intake air device according to claim 92, wherein the molded body is comprised of resin.*

*95. An intake air device for an internal combustion engine according to claim 90 or 92, wherein said one piece structure includes a distributing chamber for distributing air to the plurality of independent branching intake air conduits.*

*96. An intake air device for an internal combustion engine according to claim 90 or 92, wherein said one piece structure includes a throttle chamber having a throttle valve arranged between said air cleaner chamber and said distributing chamber.*

*97. An intake air device for an internal combustion engine according to claim 90 or 92, wherein a variable intake air valve is integrated with the branching intake air conduits.*

*98. An intake air device for an internal combustion engine according to claim 90 or 92, wherein an EGR valve is integrated with said air cleaner chamber.*

*99. An intake air device for an internal combustion engine according to claim 45, wherein an air flow rate measuring chamber having an intake air measuring unit and a throttle chamber having a throttle valve are integrated with said air cleaner chamber and said distributing chamber, respectively.*

*100. An intake air device for an internal combustion engine according to claim 90 or 92, wherein a fuel gallery is integrated with the branching intake air conduits.*

*101. An intake air device for an internal combustion engine according to claim 100, wherein said fuel gallery is comprised of an attaching portion for a fuel injection valve, a fuel pipe for supplying fuel to the fuel injection valve and an air pipe for atomizing, wherein said attaching portion, said fuel pipe and said air pipe are formed of a molded one piece structure.*

*102. An intake air device according to claim 101, wherein the molded one-piece structure is comprised of resin.*

*103. An intake air device for an internal combustion engine comprising a plurality of independent branching intake air conduits, at least one auxiliary fluid passage having an auxiliary air control valve therein integrated with one of the independent branching intake air conduits, and an air cleaner chamber having an air cleaner therein integrated with the independent branching intake air conduits, wherein said independent branching intake air conduits, said auxiliary fluid passage and said air cleaner chamber are formed of a molded one-piece structure.*

*104. An intake air device for an internal combustion engine according to claim 103, wherein said independent branching intake air conduits are arranged symmetrically with respect to one another and said air cleaner chamber is arranged in an opposing relationship to said independent branching intake air conduits.*

*105. An intake air device for an internal combustion engine according to claim 103, wherein an EGR gas passage is formed of a resin and integrated with the auxiliary fluid passage in the one-piece structure.*

*106. An intake air device according to claim 103, wherein the molded one-piece structure is comprised of resin.*

*107. An intake air device for an internal combustion engine according to claim 105, wherein said auxiliary fluid passage is formed adjacent to a side of said one of the independent branching intake air conduits.*

*108. An intake air device for an internal combustion engine according to claim 105, wherein ends of said auxiliary fluid passage are connected to two sides of said one of the independent branching intake air conduits.*

*109. An intake air device for an internal combustion engine according to claim 107 or 108, wherein a throttle valve is provided in one of said independent branching intake air conduits.*

*110. An intake air device for an engine of an electronic control fuel injection type, wherein a plurality of independent branching intake air conduits, an air cleaner chamber having an air cleaner therein, a collector for distributing air to said branching intake air conduits and a throttle having a throttle valve therein are integrated in a unit, wherein air passing through said unit passes through the air cleaner chamber, the throttle valve, the collector and the independent branching intake air conduits without passing through any connecting passage such as a rubber hose, the intake air device including at least one fluid passage provided in parallel to one of said branching intake air conduits, wherein said fluid passage is located so that air flowing through the fluid passage will generate a swirl in a combustion chamber of the engine connected to said one of said branching intake air conduits, and wherein an opening area of said fluid passage into said one of said branching intake air conduits is smaller than a cross-section area of said one of said branching intake air conduits.*

*111. An intake air device for an engine of an electronic control fuel injection type, wherein a plurality of independent branching intake air conduits, an air cleaner chamber having an air cleaner therein, a collector for distributing air to said branching intake air conduits and a throttle having*

*a throttle valve therein are integrated in a unit, the intake air device including at least one fluid passage provided in parallel to one of said branching intake air conduits, wherein said fluid passage is located so that air flowing through the fluid passage will generate a swirl in a combustion chamber of the engine connected to said one of said branching intake air conduits, and wherein an opening area of said fluid passage into said one of said branching intake air conduits is smaller than a cross-section area of said one of said branching intake air conduits.*

*112. An intake air device for an internal combustion engine, wherein a plurality of independent branching intake air conduits, a cleaner chamber having a cleaner therein integrated with the plurality of independent branching intake air conduits and an air flow rate chamber having an air flow meter therein integrated with said cleaner chamber are formed in a unit, said unit being mounted onto the engine.*

*113. An intake air device for an internal combustion engine according to claim 112, wherein said unit includes a control unit for controlling an operating state of the engine.*

*114. An intake air device for an internal combustion engine according to claim 113, wherein said control unit is attached onto an outer wall of the cleaner chamber.*

*115. An intake air device for an internal combustion engine, wherein a plurality of independent branching intake air conduits, a cleaner chamber having a cleaner therein integrated with the plurality of independent branching intake air conduits and a control unit for controlling an operating state of the engine are formed in a unit, said unit being mounted onto the engine.*

*116. An intake air device for an internal combustion engine according to claim 112 or 115, wherein said unit comprised of said plurality of branching intake air conduits, said cleaner chamber and said air flow rate chamber is formed of a resin.*

*117. An intake air device for an internal combustion engine comprising a surge tank, a plurality of independent branching intake air conduits arranged along an outer periphery of the surge tank and sharing a part of a wall surface with the surge tank, a cleaner chamber having a cleaner therein and integrated with the surge tank, an air flow rate chamber having an air flow meter therein arranged between the surge tank and the cleaner chamber and integrated with the surge tank and the cleaner chamber, and a throttle chamber having a throttle valve therein, wherein said throttle chamber is arranged between the independent branching intake air conduits, and wherein lengths of each of the independent branching intake air conduits are substantially the same.*

*118. An intake air device for an internal combustion engine comprising a cleaner chamber formed in a rectangular block with an inlet port on the one side and having a cleaner therein, a tank for distributing intake air arranged in parallel to the longitudinal direction of the rectangular block of said cleaner chamber, a plurality of independent branching intake air conduits integrated with said tank, said cleaner chamber and said air distributing tank being integrated with one another, and a throttle chamber having a throttle valve therein, wherein said cleaner chamber, said air distributing tank and said throttle chamber are formed in a unit, wherein air received from said inlet port flows through said unit in a U-shaped stream.*

*119. An intake air device for an internal combustion engine according to claim 118, wherein the air flow is bent by substantially 90 degrees between the cleaner chamber and the throttle chamber and bent by substantially 90 degrees between the throttle chamber and the air distributing tank.*

*120. An intake air device for an internal combustion engine according to claim 118, wherein the air flow is bent by substantially 90 degrees between the air distributing tank and the plurality of branching intake air conduits.*

*121. An intake air device for an internal combustion engine according to claim 118, wherein said unit includes a control unit for controlling an operating state of the engine.*

*122. An intake air device for an internal combustion engine according to claim 118, wherein said control unit is attached to a wall of said cleaner chamber.*

*123. An intake air device for an internal combustion engine of an electronic control fuel injection type, wherein a plurality of independent branching intake air conduits, an air chamber including an air cleaner, a throttle chamber including a throttle valve and a distributing tank for distributing air from the throttle chamber to the independent branching intake air conduits are integrated in a unit, the length of said unit in the longitudinal direction being nearly equal to the length of the engine body in the longitudinal direction.*

*124. An intake air device for an internal combustion engine of an electronic control fuel injection type according to claim 123, wherein said unit is formed of a resin.*

*125. An intake air device for an internal combustion engine of an electronic control fuel injection type, wherein a plurality of independent branching intake air conduits, a first chamber integrated with said plurality of independent branching intake air conduits and a second chamber having an air intake port are horizontally aligned to be integrated in a unit, a throttle chamber having a throttle valve being provided between the first chamber and the second chamber.*

*126. An intake air device for an internal combustion engine of an electronic control fuel injection type according to claim 123, wherein a cleaner and a control unit for controlling the engine are arranged inside the first chamber.*

*127. An intake air device for an internal combustion engine of an electronic control fuel injection type according to claim 125, wherein a flow rate measuring chamber for measuring air flow rate is arranged adjacent to the throttle chamber.*

*128. An intake air device for an engine of an electronic control fuel injection type, which includes a vessel, an air cleaner chamber formed in an air inlet port of said vessel, a plurality of independent branching intake air conduits connected to said vessel, a distributing chamber for distributing air to said independent intake air conduits formed in the outlet port of said vessel, and a throttle valve attached between said air cleaner chamber and said distributing chamber opposed to said air cleaner chamber and said distributing chamber.*

*129. An intake air device for an engine of an electronic control fuel injection type according to claim 128, wherein said throttle valve is located outside of the independent branching intake air conduits, and wherein the air cleaner formed to have a plate-shape in a maximum length portion of the air cleaner chamber.*

*130. An intake air device for an engine of an electronic control fuel injection type according to claim 128 or 129, wherein an engine control unit for controlling the engine is attached in a position inside the air cleaner chamber, downstream of the air cleaner, said position being accessible to permit replacing said engine control unit at the same time the air cleaner is replaced.*

* * * * *